US012091910B2

(12) United States Patent
Zwierzykowski

(10) Patent No.: US 12,091,910 B2
(45) **Date of Patent: *Sep. 17, 2024**

(54) UNIVERSAL PALLETS FOR STORAGE AND DISPLAY

(71) Applicant: Peter Zwierzykowski, San Diego, CA (US)

(72) Inventor: Peter Zwierzykowski, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,861

(22) Filed: May 8, 2023

(65) Prior Publication Data

US 2023/0313601 A1 Oct. 5, 2023

Related U.S. Application Data

(63) Continuation of application No. 17/477,348, filed on Sep. 16, 2021, now Pat. No. 11,680,442, which is a (Continued)

(51) Int. Cl.
*E06B 9/06* (2006.01)
*B65D 19/06* (2006.01)
(Continued)

(52) U.S. Cl.
CPC .............. *E06B 9/063* (2013.01); *B65D 19/06* (2013.01); *B65D 19/44* (2013.01); *E06B 9/0653* (2013.01); *B65D 2519/00024* (2013.01); *B65D 2519/00029* (2013.01); *B65D 2519/00034* (2013.01); *B65D 2519/00059* (2013.01); *B65D 2519/00064* (2013.01); *B65D 2519/00069* (2013.01); *B65D 2519/00094* (2013.01); *B65D 2519/00099* (2013.01); *B65D 2519/00104* (2013.01); *B65D 2519/00164* (2013.01); *B65D 2519/00169* (2013.01); *B65D 2519/00174* (2013.01); *B65D 2519/00233* (2013.01); *B65D 2519/00238* (2013.01); *B65D 2519/00243* (2013.01); *B65D 2519/00273* (2013.01); *B65D 2519/00288* (2013.01); *B65D 2519/00318* (2013.01); *B65D 2519/00323* (2013.01); *B65D 2519/00333* (2013.01); *B65D 2519/00343* (2013.01); *B65D 2519/00502* (2013.01); *B65D 2519/00512* (2013.01); *B65D 2519/00532* (2013.01); *B65D 2519/00582* (2013.01); *B65D 2519/00641* (2013.01); *B65D 2519/00676* (2013.01);
(Continued)

(58) Field of Classification Search
CPC ........ B65D 19/06; B65D 19/44; B65D 19/00; B65D 2519/0081; B65D 2519/0082; E06B 2009/002
USPC .................. 108/55.1, 55.3, 55.5, 54.1, 51.11
See application file for complete search history.

(56) References Cited

U.S. PATENT DOCUMENTS 1,953,303 A * 4/1934 Kohlmann ......... B65D 21/0224 108/55.3
2,481,233 A * 9/1949 Morset .................... E04F 21/06 108/55.3
(Continued)

*Primary Examiner* — Jose V Chen
(74) *Attorney, Agent, or Firm* — Mintz Levin Cohn Ferris Glovsky and Popeo, P.C.

(57) ABSTRACT

Described is a pallet including a base having a length extending between a first end and a second end opposite the first end and a width transverse to the length; and a cage removably coupled to the base.

20 Claims, 24 Drawing Sheets

Related U.S. Application Data continuation of application No. 15/988,433, filed on May 24, 2018, now Pat. No. 11,136,818.

(60) Provisional application No. 62/511,170, filed on May 25, 2017.

(51) Int. Cl.
*B65D 19/44* (2006.01)
*E06B 9/00* (2006.01)

(52) U.S. Cl.
CPC .............. *B65D 2519/00805* (2013.01); *B65D 2519/0081* (2013.01); *B65D 2519/0082* (2013.01); *E06B 2009/002* (2013.01)

(56) References Cited

U.S. PATENT DOCUMENTS

| | | | | | |
|---|---|---|---|---|---|
| 2,579,655 | A | | 12/1951 | Archibald | |
| 3,133,511 | A | | 5/1964 | Phillips | |
| 3,438,343 | A | | 4/1969 | McConnell | |
| 3,499,398 | A | | 3/1970 | Murray | |
| 4,053,079 | A | | 10/1977 | Karpisek | |
| 4,261,470 | A | * | 4/1981 | Dolan | F16B 7/22 403/237 |
| 4,295,431 | A | | 10/1981 | Stavlo | |
| 4,564,109 | A | * | 1/1986 | Stavlo | B65D 19/44 294/67.1 |
| 4,703,702 | A | * | 11/1987 | Speicher | B65D 19/385 108/52.1 |
| 4,741,442 | A | | 5/1988 | Slocumb | |
| 5,078,415 | A | | 1/1992 | Goral | |
| 5,595,468 | A | * | 1/1997 | Wald | B65B 43/14 414/331.14 |
| 5,609,111 | A | | 3/1997 | Hasegawa et al. | |
| 5,626,241 | A | * | 5/1997 | Holden | A47F 7/04 108/55.3 |
| 5,641,076 | A | | 6/1997 | Englund | |
| 5,676,066 | A | | 10/1997 | Cavalier et al. | |
| 5,850,922 | A | | 12/1998 | Fraser | |
| 5,906,165 | A | * | 5/1999 | McCorkle, Jr. | B65D 19/12 108/55.1 |
| 5,979,338 | A | | 11/1999 | Salmanson et al. | |
| 6,102,206 | A | | 8/2000 | Pride | |
| 6,290,064 | B1 | | 9/2001 | Kuhn et al. | |
| 6,402,167 | B1 | | 6/2002 | Calleja | |
| 6,463,863 | B1 | | 10/2002 | Ishikawa et al. | |
| 6,581,769 | B2 | * | 6/2003 | Nist | B65D 71/0092 108/51.11 |
| 6,588,605 | B1 | | 7/2003 | Volkert et al. | |
| 6,607,083 | B1 | | 8/2003 | Webb | |
| 6,666,464 | B1 | * | 12/2003 | Mabry | B01D 1/30 280/43.24 |
| 6,675,723 | B2 | | 1/2004 | Sukeva | |
| 6,783,012 | B2 | | 8/2004 | Webb | |
| 6,939,096 | B1 | | 9/2005 | Cline et al. | |
| 7,044,065 | B2 | | 5/2006 | Arai et al. | |
| 7,270,236 | B2 | | 9/2007 | Angeletti et al. | |
| 7,971,733 | B2 | | 7/2011 | Ponto | |
| 7,997,214 | B1 | | 8/2011 | Ness | |
| 8,025,161 | B2 | | 9/2011 | Chookang | |
| 8,327,775 | B2 | | 12/2012 | Fox Harris | |
| 8,881,898 | B2 | | 11/2014 | Deforest | |
| 9,061,822 | B2 | * | 6/2015 | Ness | B65D 90/54 |
| 9,340,373 | B2 | | 5/2016 | McHugh et al. | |
| 9,422,085 | B2 | | 8/2016 | Kemmer et al. | |
| 10,633,171 | B2 | | 4/2020 | Mader | |
| 11,136,818 | B2 | | 10/2021 | Zwierzykowski | |
| 11,680,442 | B2 | | 6/2023 | Zwierzykowski | |
| 2002/0043509 | A1 | * | 4/2002 | Lajeunesse | A47F 1/087 211/74 |
| 2003/0141213 | A1 | | 7/2003 | Bartholomew et al. | |
| 2006/0032412 | A1 | * | 2/2006 | Harner | B65D 19/42 108/55.1 |
| 2006/0196838 | A1 | | 9/2006 | Mercure et al. | |
| 2009/0078660 | A1 | | 3/2009 | Kin | |
| 2009/0240809 | A1 | | 9/2009 | La et al. | |
| 2009/0241809 | A1 | | 10/2009 | Head | |
| 2012/0145049 | A1 | | 6/2012 | Schumacher | |
| 2015/0069053 | A1 | | 3/2015 | Bradford et al. | |
| 2015/0259098 | A1 | | 9/2015 | Sanger | |
| 2017/0342768 | A1 | | 11/2017 | Zwierzykowski | |
| 2018/0340368 | A1 | | 11/2018 | Zwierzykowski | |
| 2022/0178198 | A1 | | 6/2022 | Zwierzykowski | |

* cited by examiner

UNIVERSAL PALLETS FOR STORAGE AND DISPLAY

CROSS-REFERENCE TO RELATED APPLICATION

This application is a continuation of U.S. patent application Ser. No. 17/477,348, filed Sep. 16, 2021, which is a continuation of U.S. patent application Ser. No. 15/988,433, filed May 24, 2018, now U.S. Pat. No. 11,136,818, which claims the benefit of priority under 35 U.S.C. § 119(e) to U.S. Provisional Patent Application Ser. No. 62/511,170, filed May 25, 2017. The disclosure of the applications are incorporated by reference in their entireties.

FIELD

The subject matter described herein relates to pallets for loading, holding, storing, transporting, and display of inventory, and more specifically, to universal pallets for storage and display.

BACKGROUND

Pallets are critical to supply chains for their role in loading, holding, moving and storing inventory. With the surge in popularity of "big box" or warehouse retail stores where inventory is intended to move at higher volumes, pallets are now ubiquitous in the display and storage of that inventory. Due to the increased proximity between these large volumes of inventory stored on pallets and the average shopper perusing the goods, pallet safety has become more of a concern.

Some inventory stored on pallets is stocked vertically above the customers on warehouse racks. The inventory stored on a pallet is typically packaged in shrink-wrap to prevent anything from falling off the pallet. Once the shrink-wrap is opened, however, safety in storing that inventory vertically above customers becomes a concern because the inventory can shift on the pallet and fall down. The shrink-wrapped pallets, once opened to remove an item, must be brought down to the floor for safety reasons. Then, sales associates must spend time finding storage locations for the remaining inventory on the pallet. Time spent moving and relocating the remaining inventory prevents customers from shopping in those aisles costing the retailer in lost sales.

It is desirable to provide a pallet that is readily movable, provides convenient access to inventory, and is safe in storing remaining inventory left on the pallet even when part of the inventory has been removed.

SUMMARY

In an aspect, described is a pallet including a base having a length extending between a first end and a second end opposite the first end and a width transverse to the length; and a cage removably coupled to the base.

The base can further include a top deckboard; a bottom deckboard; and a plurality of support blocks coupled between the top deckboard and the bottom deckboard. The base can be configured for full forklift access along at least the length and the width of the base. The cage can include a first side coupled to a back side coupled to a second side. The pallet can further include a removable gate forming a front side of the cage. The removable gate can be attached to at least the first side. The removable gate can be an expandable barrier having a multiplicity of slats hingedly interconnected in a scissoring lattice-type structure configured to expand outward from a compact, collapsed narrow configuration to an expanded, wider configuration. The pallet can include plurality of support members removably attached to one or more regions of the cage. The plurality of support members can be adjustably coupled to a backside of the cage and extend a distance towards a front side of the cage. The plurality of support members can be arranged relative to the pallet such that individual items of inventory are insertable within slots between the support members. The support members can be spaced to provide organization and support to planar inventory stored vertically upright. The planar inventory can include one or more of doors, windows, SHEETROCK, or slabs of materials. The items of inventory can be removable from a front side of the cage or a lateral side of the cage.

The plurality of support members can be clamped onto a back side of the cage by way of a reversible coupling. The reversible coupling can be adjustable along the width of the base such that a width of the slots is adjustable. The plurality of support members can extend upward from and can be removably attached to the base.

The pallet can further include one or more grates configured to support elongate elements in a vertical position relative to the cage. The one or more grates can include an upper grate positioned near a top of the cage and a lower grate positioned near the base. Each of the one or more grates can include a matching pattern of slots aligned to receive an elongate element in a vertical position. The matching pattern of slots can include slots having a shape that is square, rectangular, oval, round, or other geometric shape. The pallet can further include one or more shelves supported by the cage. The one or more shelves can be removably adjustable along a vertical dimension relative to the cage.

In an interrelated aspect, disclosed is a retail display and safety pallet including a pallet base having a horizontal upper surface and a plurality of sides coupled substantially perpendicular relative to the horizontal upper surface of the pallet base near an outer perimeter of the pallet base. The plurality of sides and the upper surface collectively define an interior region. The pallet includes at least one support member having a first end configured to adjustably couple to one of the plurality of sides at a plurality of selectable positions and a second, opposite end extending away from the one of the plurality of sides. The at least one support member divides the interior region into a plurality of slots, each of the plurality of slots having a width and being open near the second, opposite end of the at least one support member. The width of each of the plurality of slots is adjustable based upon a selected position of coupling between the at least one support member and the one of the plurality of sides.

The pallet base can include a length extending between a first end and a second end opposite the first end and a width transverse to the length. The plurality of sides can be removably coupled to the pallet base. The pallet base can further include a top deckboard forming the horizontal upper surface; a bottom deckboard; and a plurality of support blocks coupled between the top deckboard and the bottom deckboard. The pallet base can be configured for full forklift access along at least the length and the width of the base. The plurality of sides can include a first side coupled to a back side coupled to a second side. The pallet can further include a removable gate forming a front side of the plurality of sides. The removable gate can be attached to at least the first side. The removable gate can be an expandable barrier having a multiplicity of slats hingedly interconnected in a scissoring lattice-type structure configured to expand outward from a compact, collapsed narrow configuration to an expanded, wider configuration. The pallet can further include a plurality of support members. The first end of each of the plurality of support members can adjustably couple to the back side and the second, opposite end extends a distance towards a front side. The plurality of support members can be arranged relative to the pallet such that individual items of inventory are insertable within the plurality of slots between the plurality of support members. The plurality of support members can be spaced to provide organization and support to planar inventory stored vertically upright. The planar inventory can include one or more of doors, windows, SHEETROCK, or slabs of materials. The items of inventory can be removable from the front side. The plurality of support members can be adjustably coupled to the back side.

In an interrelated aspect, disclosed is a retail display and safety pallet including a pallet base having a horizontal upper surface and a plurality of sides coupled substantially perpendicular to the horizontal upper surface of the pallet base near an outer perimeter of the pallet base. The plurality of sides and the upper surface collectively defining an interior region. The pallet includes at least one support member having a lower end configured to adjustably couple to the pallet base at a plurality of selectable positions and an opposite, upper end extending away from the pallet base. The at least one support member divides the interior region into a plurality of slots, each of the plurality of slots having a width and being open from at least a first end. The width of each of the plurality of slots is adjustable based upon a selected position of coupling between the at least one support member and the pallet base.

The pallet base can have a length extending between a first end and a second end opposite the first end and a width transverse to the length. The plurality of sides can be removably coupled to the pallet base. The pallet base can further include a top deckboard forming the horizontal upper surface; a bottom deckboard; and a plurality of support blocks coupled between the top deckboard and the bottom deckboard. The pallet base can be configured for full forklift access along at least the length and the width of the base. The plurality of sides can include a first side and a second side. The pallet can include a plurality of support members. The plurality of support members can be arranged relative to the pallet such that individual items of inventory are insertable within the plurality of slots between the plurality of support members. The plurality of support members can be spaced to provide organization and support to planar inventory stored vertically upright. The planar inventory can include one or more of doors, windows, SHEETROCK, or slabs of materials.

In some variations, one or more of the following can optionally be included in any feasible combination in the above methods, apparatus, devices, and systems. More details are set forth in the accompanying drawings and the description below. Other features and advantages will be apparent from the description and drawings.

BRIEF DESCRIPTION OF THE DRAWINGS

These and other aspects will now be described in detail with reference to the following drawings.

Figure 1:
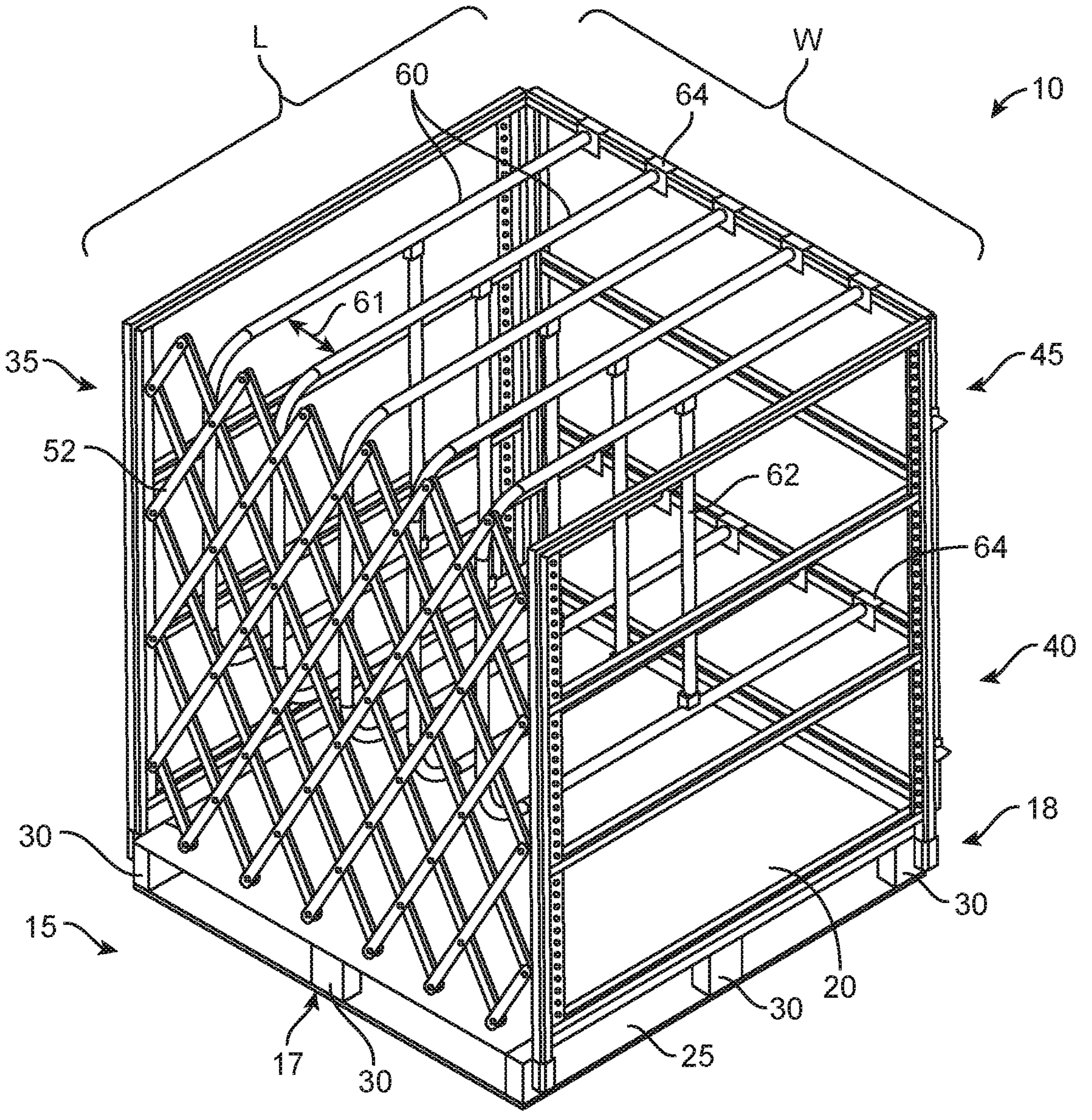
FIG. 1 is a perspective, front view of an implementation of a pallet.
Figure 2:
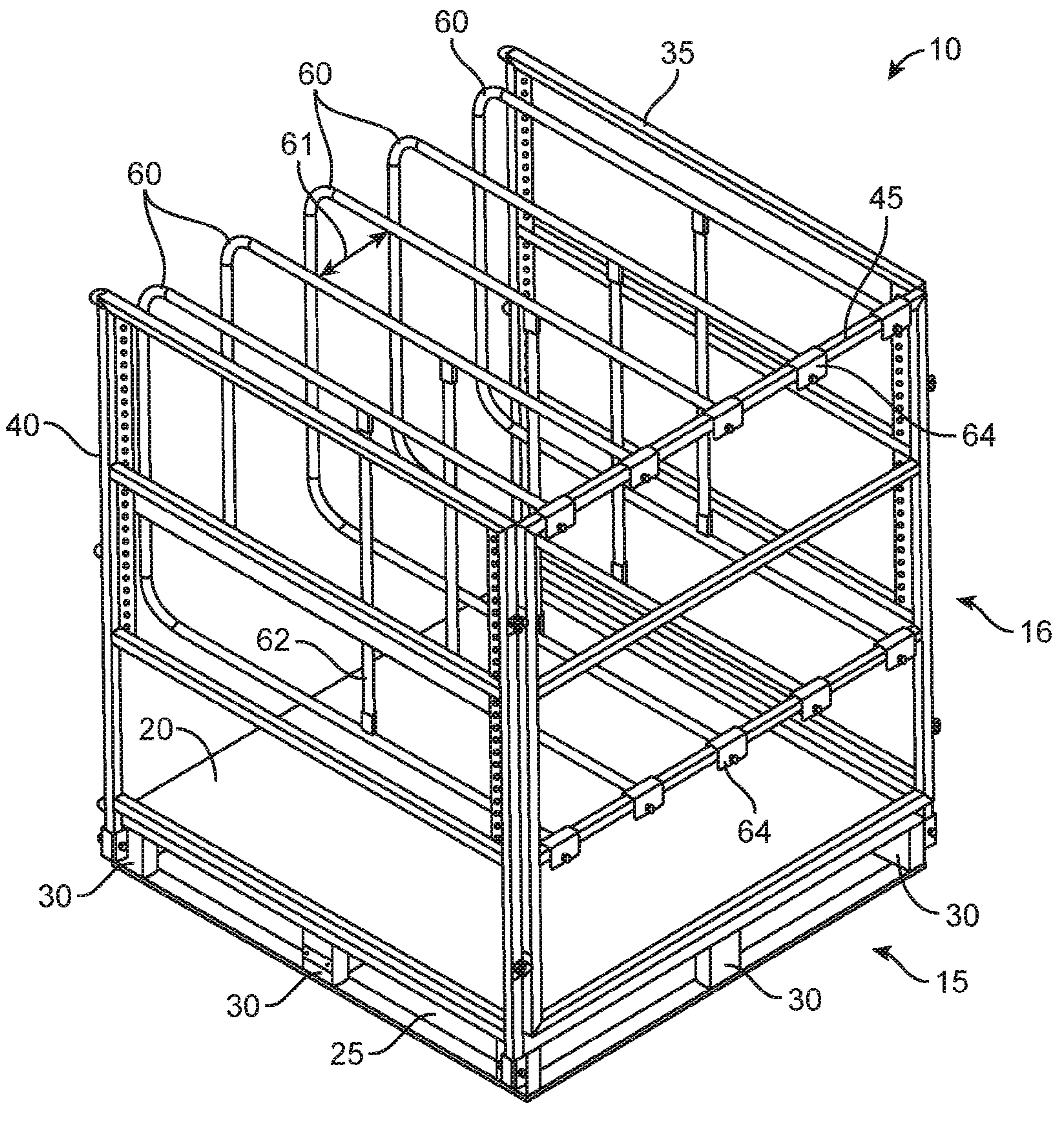
FIG. 2 is a perspective, rear view of the pallet of FIG. 1 with the gate removed.
Figure 3:
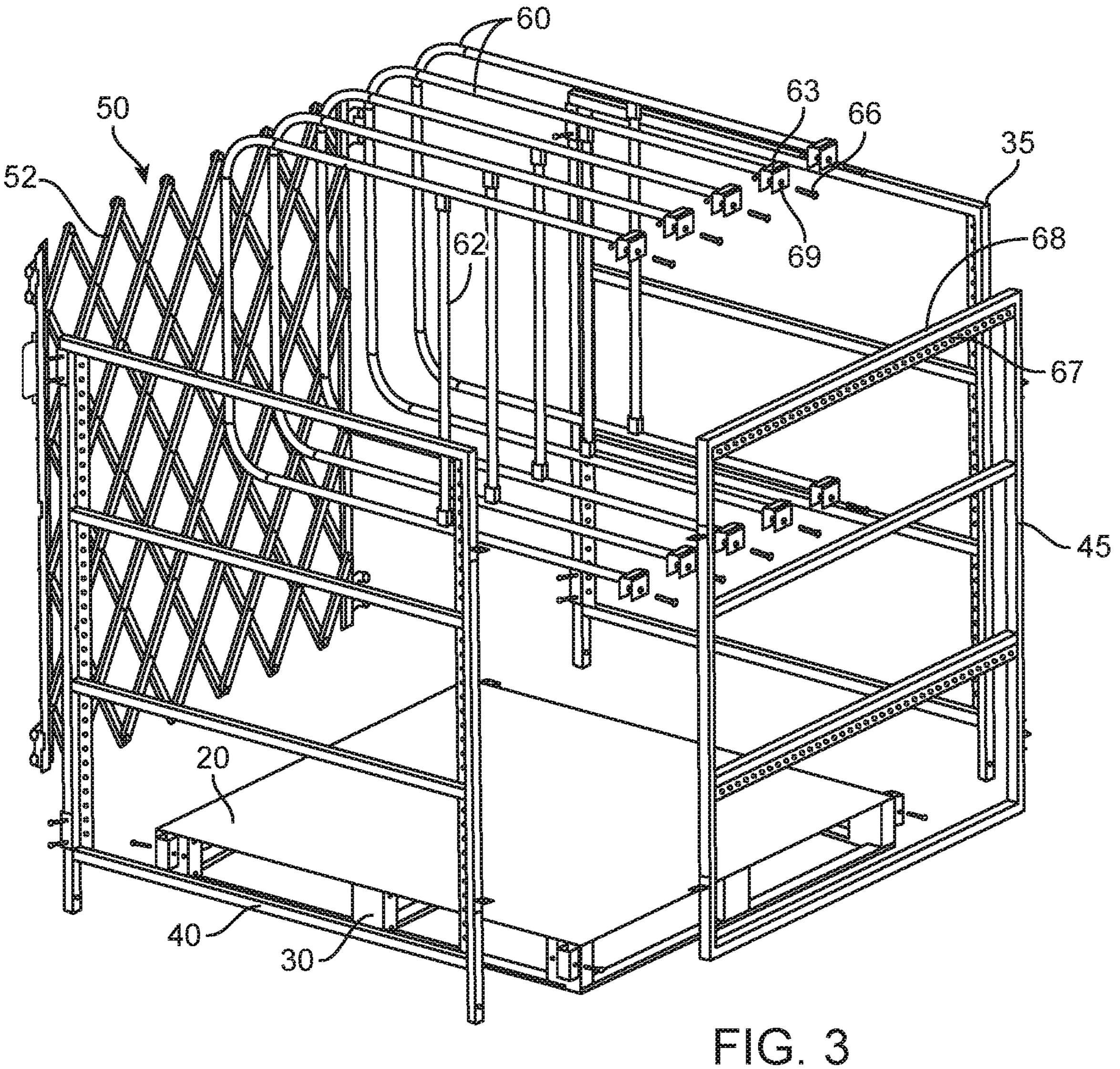
FIG. 3 is an exploded, rear view of the pallet of FIG. 1.

Generally speaking, the FIGURES are not to scale in absolute terms or comparatively, but are intended to be illustrative. Also, relative placement of features and elements may be modified for the purpose of illustrative clarity. It should be understood that devices described herein may include features no necessarily depicted in each FIGURE.

DETAILED DESCRIPTION

Described herein are pallets for warehouse storage and retail display of inventory in a safe, organized, and more accessible manner. The pallets are universal or modular in that various components can be removed and/or adjusted to accommodate inventory of various sizes and shapes.

Although the pallets are described herein in the context of their use for safety and display of certain types of inventory such as different doors (pre-hung, patio doors, French doors, etc.), windows, carpet, elongate tools, paint, and other retail items, the pallets are usable for any number of purposes and for any of a variety of inventory types and used in any of a variety of locations. Additionally, the pallets described herein are modular such that they can be customized to receive any of a variety of inventory types. The pallets described herein can be used for both outdoor and indoor applications. In some implementations, the pallets described herein are useful for indoor areas including residential buildings, retail buildings such as shopping malls, or warehouse "box" stores, other public venues such as maintenance locations. It should also be appreciated that relative, directional language and terms regarding orientation such as "right," "left," "upper," "lower," "inner," "outer," "backward," "forward," "upward," "downward," "inward," "outward" and the like are used throughout merely for convenience for description and are not intended to be limiting.

Turning to the drawings, FIGS. 1-5 illustrate a first implementation of a pallet 10 having a pallet base 15 having an upper surface that is substantially horizontal and having an upper cage 16 forming a plurality of sides coupled substantially perpendicular relative to the upper surface of the pallet base 15. The plurality of sides can be coupled near an outer perimeter of the base 15 such that the plurality of sides and the upper surface of the base can collectively define an interior region to the pallet 10.

The plurality of sides may be referred to herein as a cage although use of the term "cage" is not intended to be limiting or require the cage to be enclosed. Use of the term "cage" need not imply a full enclosure on 4 sides or 5 sides (e.g. including a top end). Rather, "cage" as used herein refers to a portion of the pallet 10 positioned relative to an upper surface of the base 15 that is designed to display, hold, organize, support, prop up, and/or otherwise contain inventory on the upper surface of the base 15.

The pallet base 15 can be removably coupled to an upper cage 16. The base 15 includes a length L extending between a first end 17 and a second end 18 opposite the first end 17 and a width W transverse to the length L. The base 15 of the pallet 10 can include a top deckboard 20 and a bottom deckboard 25 having a plurality of support blocks 30 coupled between the top deckboard 20 and the bottom deckboard 25. Although the pallet 10 is shown as being a block pallet configured for full forklift access on all four sides, the pallet 10 can also be configured as a stringer pallet allowing for full access on only two sides and no or partial entry on the other two sides.

Again with respect to FIGS. 1-5, the cage 16 removably coupled to the base 15 can be enclosed on all four sides or can be open on at least one side. In some implementations, the cage 16 can include a first side 35 coupled to a back side 45 coupled to a second side 40 forming a three-sided cage element. In another implementation, the cage 16 can include a plurality of sides coupled substantially perpendicular to the horizontal upper surface of the pallet base near an outer perimeter of the pallet base. For example, two opposing sides can each be positioned near an outer edge of the base 15 and the sides and the upper surface of the base 15 can collectively define an interior region. The configuration of the sides 35, 40, 45 can vary. In some implementations, the sides 35, 40, 45 are solid and in other implementations, the sides 35, 40, 45 are formed by a plurality of elongate bars spanning from one end to an opposite end. In still further implementations, the sides 35, 40, 45 can be formed of or have removably attached thereto a fence, screen, net, canvas or other material designed to at least partially enclose the sides.

The materials, weights, and overall sizes of the components of the cage 16 and base 15 described herein can vary to satisfy different user preferences, such as more robust, heavy-duty metal materials for some implementations and less robust, lighter-weight, plastic materials for other implementations. The base 15 as well as the components of the cage 16 can be formed of a variety of materials known in the art including wood, plastic, foam, rubber, metal, and the like. In some implementations, at least the top deckboard 20 can be formed of a steel plate such as a diamond-plated steel. The diamond plate can be reversed such that the 3-dimensional surface features (i.e. diamonds) face towards the bottom deckboard 25. The surface features positioned on the underneath side of the top deckboard 20 provides increased friction for lifting, such as with a forklift.

The material of the base 15 can be capable of supporting the weight of the material to be held and stored by the pallet 10. The base 15 can be solid as shown in FIG. 1 or can be formed by a plurality of beams oriented across the width W of the pallet or length L of the pallet 10. The base 15 can also be formed of a wire, mesh or other material or configuration. The materials of the sides 35, 40, 45 can vary as well, but generally are formed of steel or another metal.

The dimensions of the base 15 can vary depending on the size, weight, and amount of inventory it is to be used with. In some implementations, the length and width each can be between about 42 inches to about 46 inches such that the pallet 10 can be useful to hold securely a plurality of pre-hung doors having standard size, each ranging up to about 42 inches wide. In other implementations, the base 15 can have a width up to about 94 inches wide such that inventory like doors and windows can be stored on their side. The dimensions recited herein are intended to provide an example size and are in no way limiting. The dimensions of the components can vary according to the inventory the device is intended to be used with.

Figure 4:
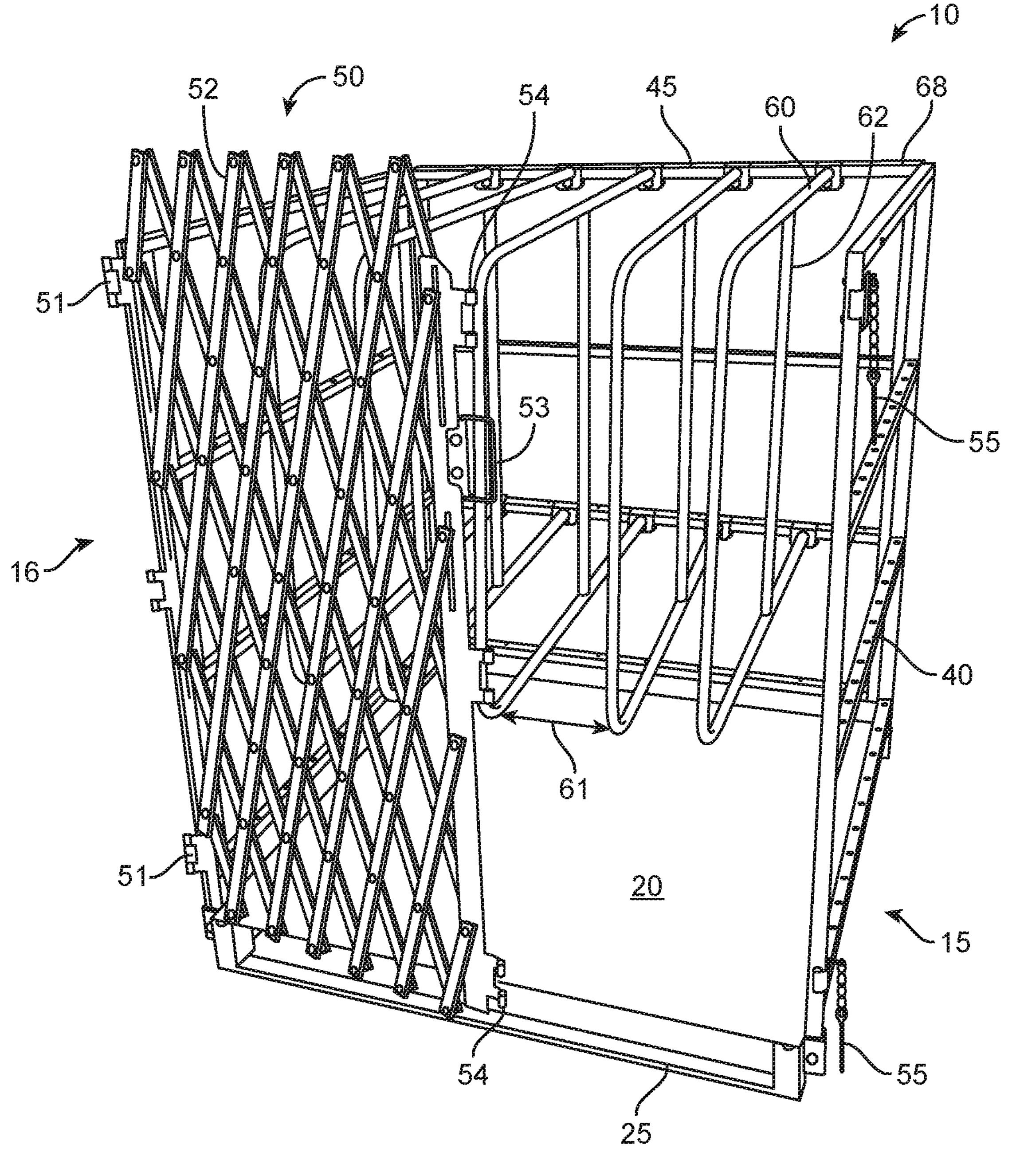
FIG. 4 is a front view of the pallet of FIG. 1 showing the gate partially opened.

Again with respect to FIG. 1, the cage 16 can further incorporate a removable gate 50 forming a front side of the cage 16 to enclose inventory held by the pallet 10 on at least four sides. The gate 50 can be an articulating expandable barrier as described in co-pending U.S. Patent Publication No. 2017/0342768, which is incorporated by reference herein. The gate 50 can be removably attached to at least the first side 35 and/or second side 40 of the cage 16. In some implementations, the gate 50 can be an expandable barrier having a multiplicity of slats 52 hingedly interconnected in a scissoring lattice-type structure as is known in the art. It should be appreciated that a variety of expandable structure configurations are considered herein so long as the expandable sections are readily expanded outward from a compact, collapsed narrow configuration (FIG. 4 illustrates a partially collapsed gate 50) to an expanded, wide configuration shown in FIG. 1. In the narrow configuration, edges of the slats 52 can abut one another such that each of the slats 52 extends substantially parallel to one another and generally perpendicular to the floor. In the expanded wider configuration, the edges of the slats 52 can be separated from one another forming an open lattice structure to achieve a maximum extension between the first and second sides 35, 40. Although the gate 50 shown in the FIGURES incorporates an open lattice type structure, that the barriers described herein can also incorporate a closed structure such that the space between the slats 52 is covered by a material such as a fabric, plastic, or other material. Also, the relative thickness of each of the slats 52 can vary providing differing degrees of privacy and protection on either side of the gate 50. The gate 50 may include more than one expandable section, including 2, 3, 4, 5 or more sections configured to be pivotably attached to one another for creating an enlarged space of various geometries.

Still with respect to FIG. 4, the gate 50 can include a handle 53 as well as one or more fasteners 54 for fixing the gate 50 in a closed position relative to the sides 35, 40. In some implementations, the fastener 54 can be a barrel bolt configured to receive a pin 55. The fastener 54 can be any of a variety of configuration and can be configured to withstand a force inadvertently applied against the gate 50, such as by the inventory, without giving way. The fastener 54 can include hasps, catches, and latches such as a deadbolt latch, spring latch, slam latch, cam lock, Norfolk latch, Suffolk latch, crossbar, cabin hook, or other type of fastening mechanism. The gate 50 can be hinged on the side opposite the fasteners 54. A center axis of the hinges 51 can be offset from the slats of the gate, for example, moved laterally outward such that the gate 50 can be opened and swung around the hinges 51 up to about 270 degrees to abut flat against the adjacent side (see FIG. 4). For example, the gate 50 can swing around the hinges 51 from a fully closed position in which the gate 50 forms the front side of the cage 10 and can be latched with fasteners 54 to a fully opened position in which the gate 50 abuts against the side 35 (or side 40 if the hinges 51 are positioned adjacent that side 40). One or more magnetic features can be incorporated on the gate or the sides 25, 40 such that the gate 50 is magnetically attracted to side 35, 40 and maintained in an open position and does not inadvertently swing back around its hinges 51. Where features are described herein in reference to one side, the same feature can be incorporated on any of the other sides of the device, including hinges, closures, fixators, adjustment mechanisms, and the like. Similarly, where a feature is described herein in reference to one implementation (e.g. the implementation shown in FIG. 1), it should be appreciated that any of the other implementations may also incorporate that feature without expressly described as such.

The cage 16 of the pallet 10 can include at least one support member 60. The at least one support member 60 can have a first end configured to adjustably couple to one of the plurality of sides at a plurality of selectable positions and a second, opposite end extending away from the one of the plurality of sides. The support member 60 can also have a lower end configured to adjustably couple to the pallet base 20 at a plurality of selectable positions and an opposite, upper end extending away from the pallet base 20. The support member 60 can divide the interior region, a region that can be defined collectively by the plurality of sides and the upper surface of the base 20, into a plurality of slots 61. Each of the plurality of slots 61 can have a width and be open on at least one side. For example, the slot 61 can be open near the second, opposite end of the support member 60 or from a side as described in more detail below. The width of each of the plurality of slots 61 can be adjustable based upon a selected position of coupling between the at least one support member 60 and the one of the plurality of sides or the base, as will be described below.

In some implementations, the cage 16 of the pallet 10 can include a plurality of support members 60 removably attached to one or more regions of the cage 16. In some implementations as shown in FIGS. 1-5, the support members 60 can be coupled to the back side 45 of the cage 16 and extend a distance towards the front side of the cage 16. The cage 16 can include 1, 2, 3, 4, 5, 6, or more support members 60 creating 2, 3, 4, 5, 6, 7, or more spaces or slots 61 between the support members 60 and respective sides 35, 40 of the cage 16. The support members 60 can be arranged relative to the pallet 10 such that individual items of inventory can be inserted within the slots 61 between the support members 60. More than one item of inventory can be inserted within the slots 61 as well depending on the width of the slot 61 and the thickness of the item of inventory. The support members 60 can provide organization and support to planar inventory stored vertically upright such as doors, windows, SHEETROCK, slabs of materials. The separation provided by the support members 60 allows for items to be more easily removed from the pallet 10 (or inserted onto the pallet 10) because the weight of adjacent items are held by the support member 60 instead of against the item needing to be removed or inserted. A user can slide out only the item of interest without the rest of the items sliding along with it or falling down. The support members 60 prevent the remaining items of inventory stored on the pallet 10 from shifting and sliding as an item is removed.

Figure 5:
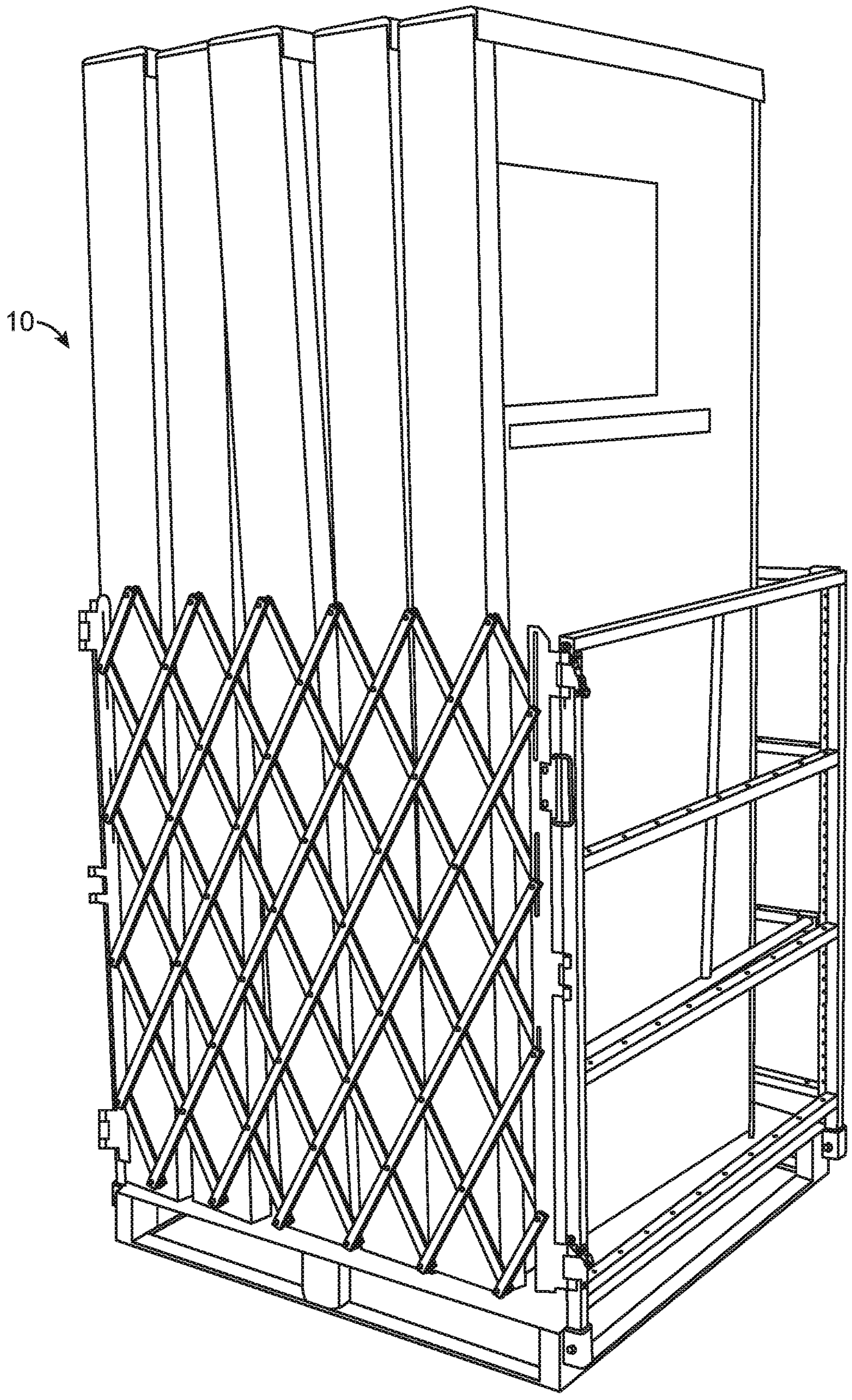
FIG. 5 is a front view of the pallet of FIG. 1 in use storing inventory.
Figure 6:
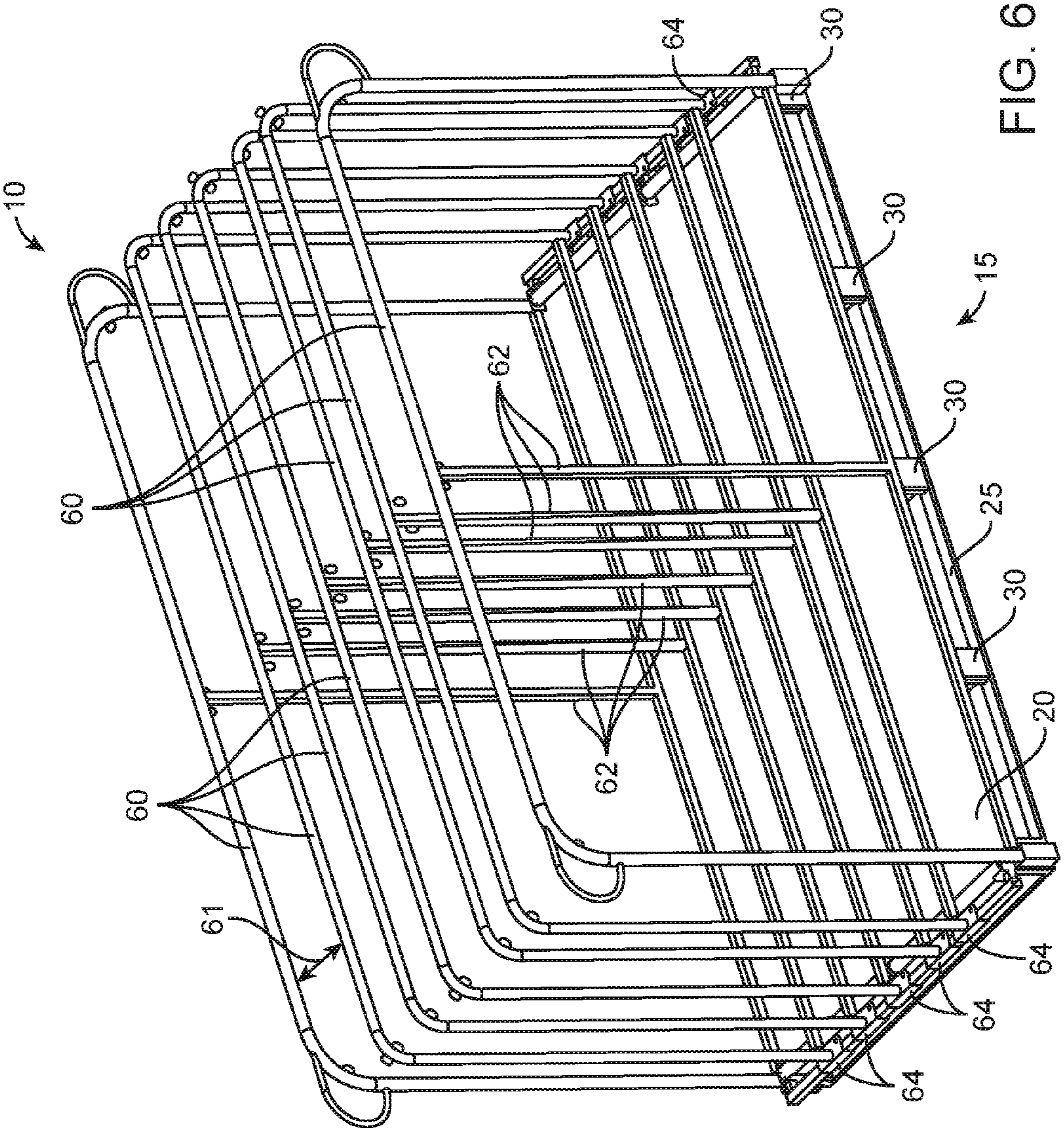
FIG. 6 is a perspective, front view of another implementation of a pallet.
Figure 7:
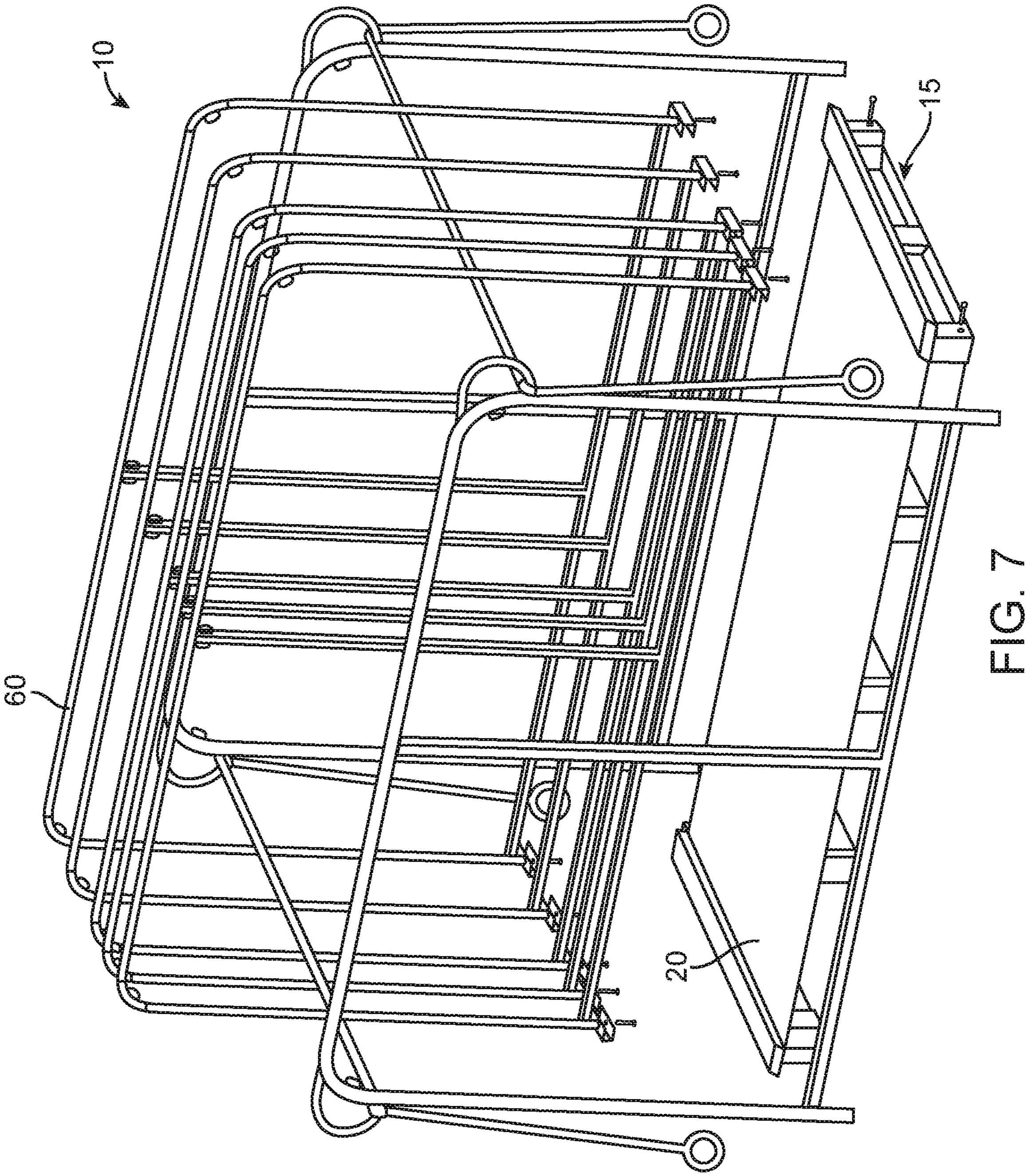
FIG. 7 is an exploded view of the pallet of FIG. 6.
Figure 8:
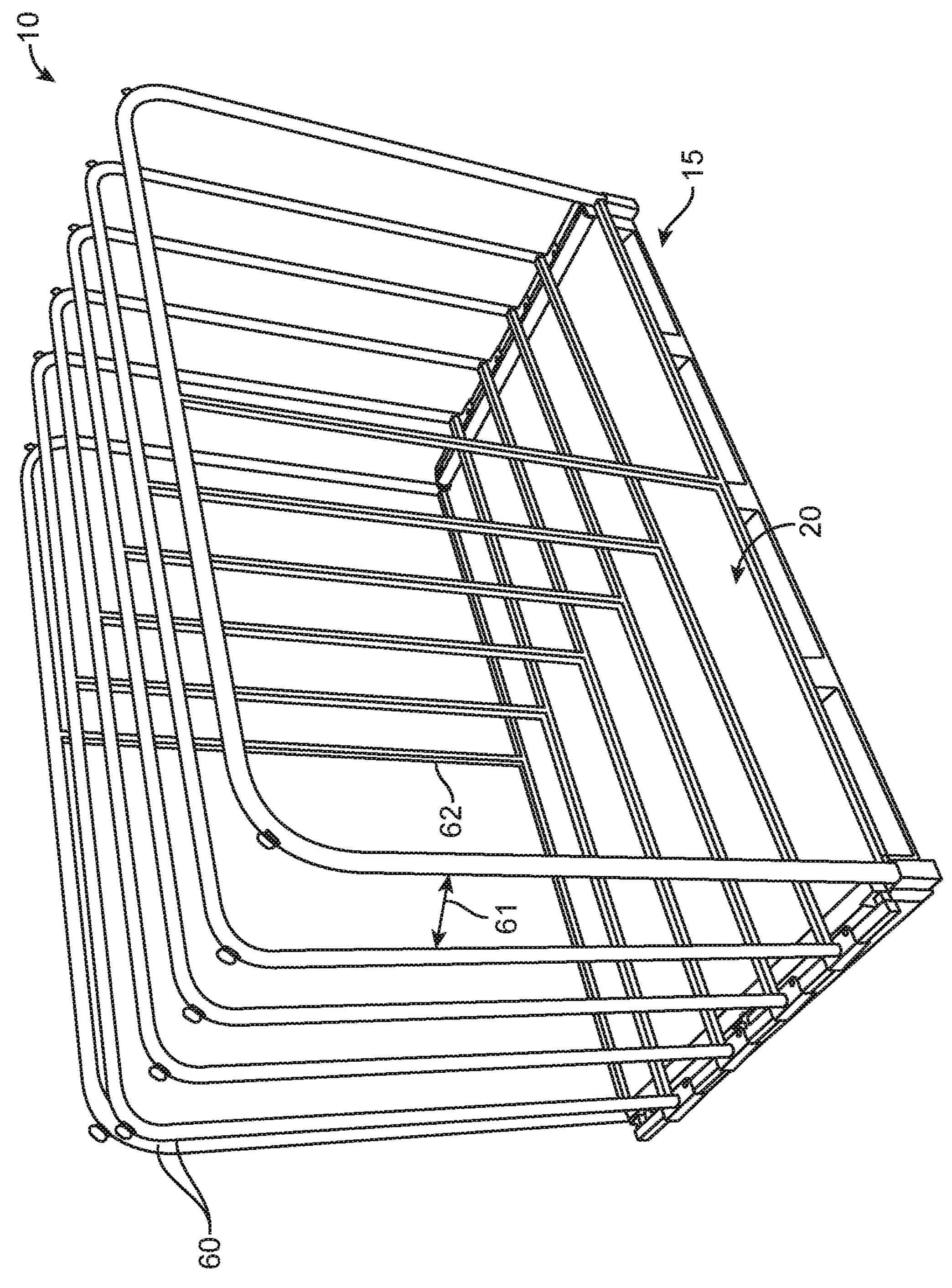
FIG. 8 is a perspective, front view of the pallet of FIG. 6.

FIG. 5 illustrates an implementation of a pallet 10 being used to hold pre-hung doors and having a cage 16 with a gate 50 on a front side closed and latched to the side 45. The width of the slot 61 created by the support members 60 is sufficient to receive at least one door such that the support members 60 help to maintain the doors in a secure upright position on top of the pallet base 15. It should be appreciate that any of a variety of inventory can be stored within the slot 61 created and the width can likewise vary, for example, from about a few inches in width up to a few feet and any fraction in between, including about 5", 10", 15", 20", 25", 30", 35", 40", 45", 50", 55", 60", 65" up to about 100" or the width of the pallet 10 itself.

The configuration of the support members 60 can vary. FIGS. 1-5 show the support members 60 include 2 horizontal bars each coupled to the back side 45 of the cage 16 forming a sideways u-shape. A vertical bar 62 can span between the horizontal bars providing additional rigidity to each support member 60. The support members 60 can connect at one or more locations of the cage 16 or base 15 so long as the support they provide is sufficient for the material being supported. The support member 60 need not be a bar, but could be a planar divider element. Also, the support members 60 need not couple to the back side 45 of the cage 16 as shown in FIGS. 1-5. The support members 60 can additionally or alternatively be coupled to extend upward from the base 15 as will be described in more detail below (see FIGS. 6-11 and FIGS. 20-21).

The orientation of the slots 61 formed by the support members 60 can vary as well. In some implementations, the slots 61 are oriented such that inventory can be inserted/removed from a front side of the cage 16 as shown in FIGS. 1-5. In other implementations, the slots 61 formed by the support members 60 can be oriented such that the inventor can be inserted/removed laterally as will be described in more detail below (see FIGS. 6-11 and FIGS. 20-21).

The support members 60 can be clamped onto the back side 45 (or other side) of the cage 16 by way of a reversible coupling 64 such that the support members 60 can be removed and/or their position along the width of the cage 16 relative to each other and to the sides 35, 40 is adjustable. This results in the width of the slots 61 being adjustable. The configuration of the coupling 64 of the support members 60 can vary including tooled and tool-less couplings. In some implementations, the coupling 64 can incorporate a pin 66 and a bracket 63 configured to receive the pin 66. The couplings described herein including the pins 66 used to fix the bracket 63 can vary, including a bolt, pin, crew, or other fixator. In some implementations, the pin 66 is a bolt such as a carriage bolt, lag bolt, or other bolt meant to provide an amount of security to prevent being unlocked. For example, the pin 66 can be a carriage bolt having a cross-section along at least a portion of its shank that is square or rectangular rather than circular. This allows the fastener to self-lock when placed through a square hole in a metal bar. The head of the carriage can be a shallow dome and can incorporate a square nut to prevent the carriage bolt from being unlocked from the insecure side.

Figure 21:
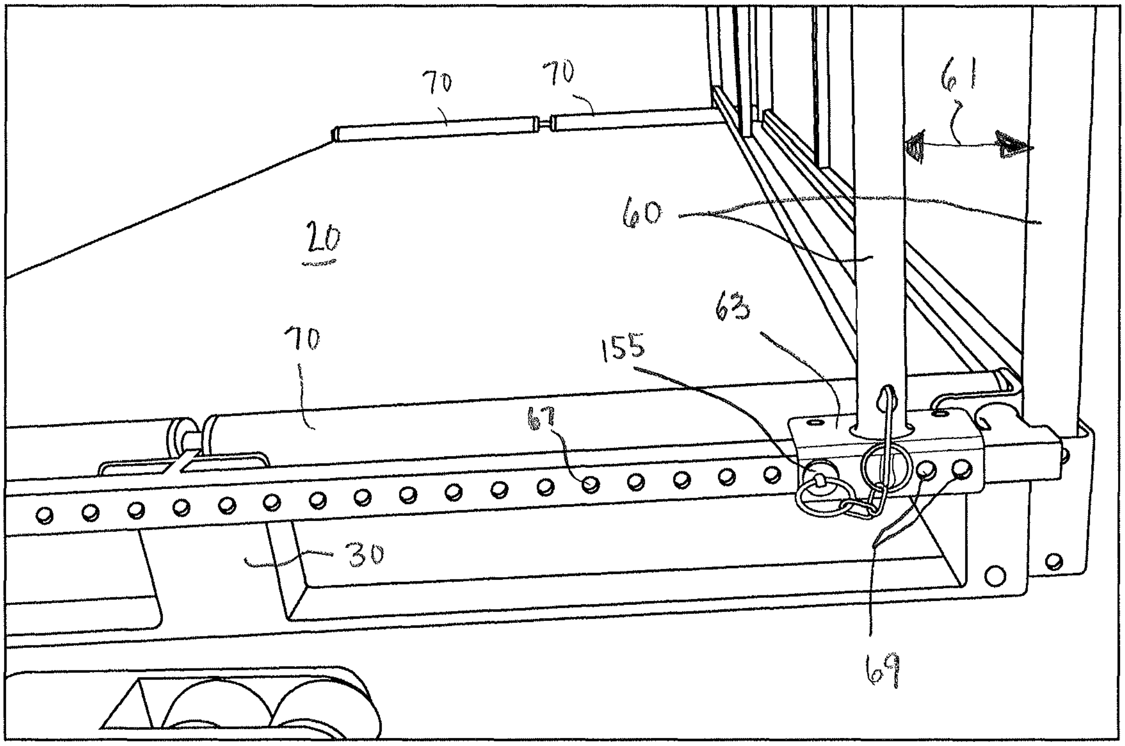
FIG. 21 shows a detailed view of the pallet of FIG. 20.

The bracket 63 can couple to one or more horizontal bars 68 of one of the sides (e.g. back side 45 shown in FIG. 4 or base 20 as shown in FIG. 21) such that the one or more apertures 69 of the bracket 63 align with one or more of the apertures 67 formed in the bar 68. The pin 66 can extend through the apertures 69 of the bracket 63 as well as the aperture 67 of the bar 68 to reversibly fix the support member 60 to its respective side. The pin 66 can fix within the aligned apertures 67, 69 in a tool-less manner to provide ease and convenience of the customization.

Figure 18A:
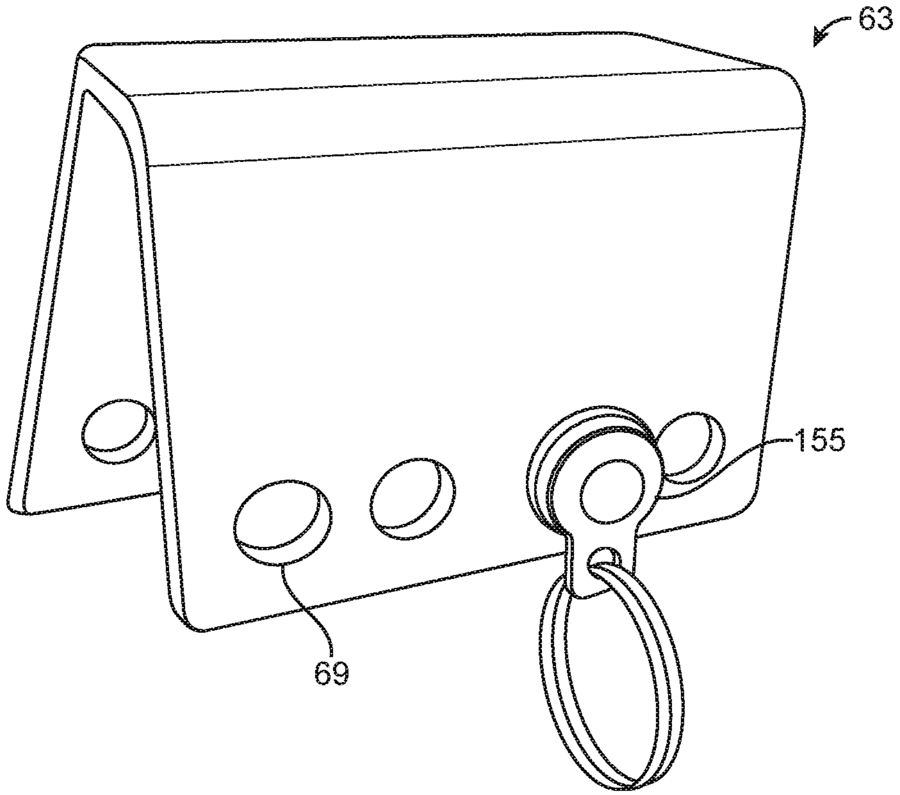
FIGS. 18A-18C show various views of a bracket coupling.
Figure 18B:
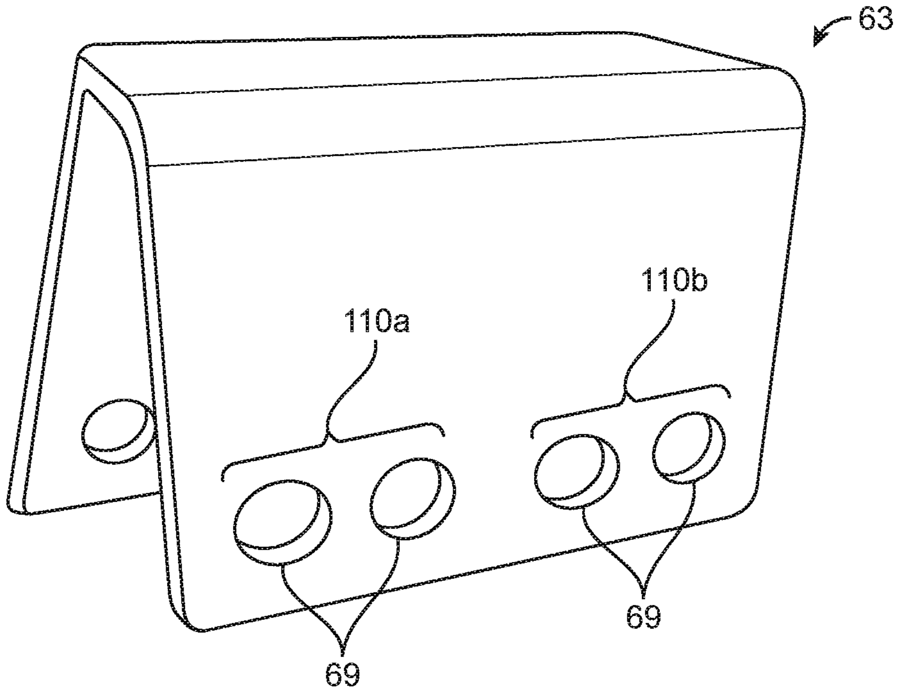
Figure 18C:
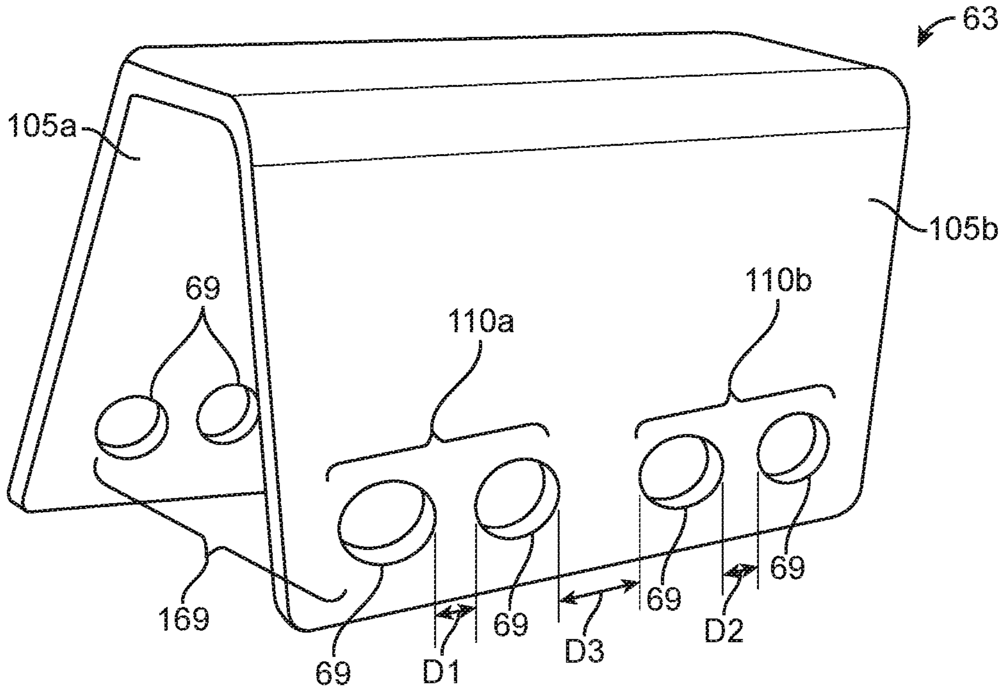
Figure 20:
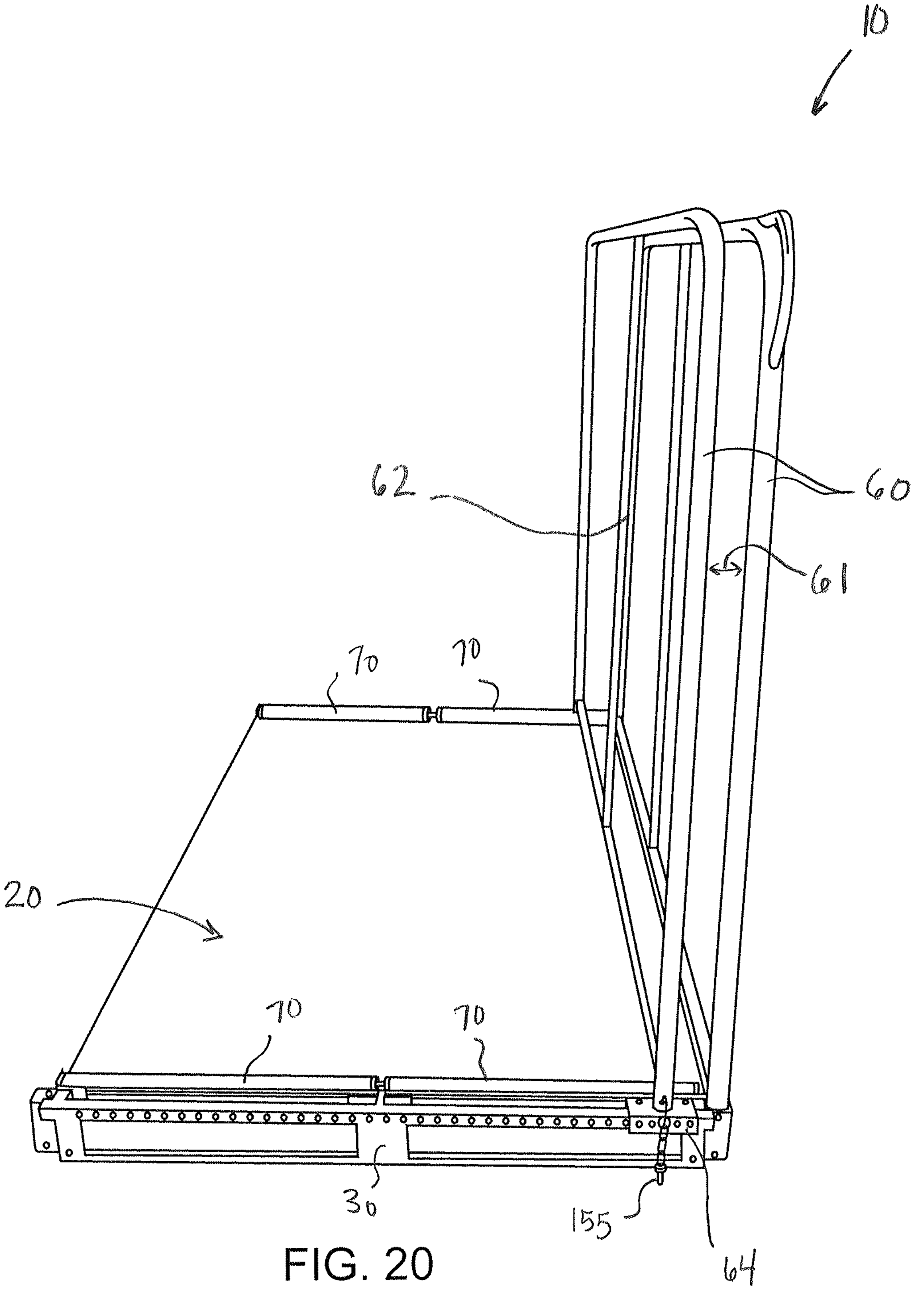
FIG. 20 shows a lateral view of an implementation of a pallet.

In some implementations, the bracket 63 is a u-shaped bracket having at least one aperture 69 formed on one side 105*a* of the bracket 63 and a corresponding aperture 69 formed on an opposing side 105*b* of the bracket 63, forming a corresponding pair of apertures 169 (see FIGS. 18A-18C). The bracket 63 can be mounted on a horizontal or vertical bar 68 of one of the sides 35, 40, 45 (or base 20 as shown in FIGS. 20-21) such that the apertures 69 through the bracket 63 align with an aperture 67 of the bar 68. The pin 66 can extend through each aperture 69 of the pair of apertures 169 as well as the intervening aperture 67 of the bar 68 thereby fixing the bracket 63 in place relative to the bar 68. Reference to a bar on the back side 45 is not intended to be limiting because one or more of the other sides 35, 40 of the pallet can also be configured to couple with the bracket 63. Also, the bracket 63 need not have a U-shape having two sides 105*a*, 105*b*. For example, the bracket 63 can be a single-sided element having a single aperture 69 extending through it such that the bracket 63 can be positioned and fixed to the bar 68.

In some implementations, the bracket 63 includes more than a single pair of apertures 169 (see FIGS. 18A-18C). The pairs of apertures 169 on the bracket 63 can be spaced along the bracket 63 such that the spacing matches the spacing of the apertures 67 on the bar to which it will be affixed. In other implementations, the pairs of apertures 169 on the bracket 63 are spaced along the bracket 63 so that the spacing does not match the spacing of the apertures 67. For example, the apertures 67 of the bar 68 can be separated along pre-defined increments such as 1" increments whereas the spacing of the pairs of apertures 169 on the bracket 63 can be at 4" increments.

In another implementation, the pairs of apertures 169 can be arranged in groups. For example, as best shown in FIG. 18C, the bracket 63 can have a first grouping 110*a* of aperture pairs 169 spaced away from a second grouping 110*b* of aperture pairs 169 such that the bracket 63 includes a total of two groupings 110 of four aperture pairs 169 or a total of eight apertures 69 on the bracket 63. A first pair of apertures 169 in the first grouping 110*a* can be spaced a first distance D1 away from a second pair of apertures 169 in the first grouping 110*a*. Similarly, a first pair of apertures 169 in the second grouping 110*b* can be spaced a second distance D2 away from the second pair of apertures 169 in the second grouping 110*b*. The first distance D1 and second distance D2 can be the same distance. The first grouping 110*a* can be spaced away from the second grouping 110*b* a third distance D3, where the third distance D3 is greater than either D1 or D2. For example, the first and second distances D1, D2 can be ¼" apart and the third distance D3 can be ½" apart. Additionally, each of these distances D1, D2, and D3 can be a fraction of the distance between the apertures 67 on the bar 68, which can be 1". This spacing relationship provides improved flexibility in adapting the spacing between the slots 61 to accommodate a wider variety of inventory widths. When the bracket 63 is positioned on a bar 68 such that the first side 105*a* is aligned with a first side of the bar 68 and the second side 105*b* of the bracket 63 is aligned on the opposite side of the bar 68, at least one pair of apertures 169 aligns with at least one intervening aperture 67 on the bar 68. This allows for the pin 66 to insert through the bracket and the bar 68 thereby fixing them in relation to one another. However, when the first pair of apertures 169 of the first grouping 110*a* is aligned with an aperture 67 on the bar 68, it is possible that none of the remaining pairs of apertures 169 on the bracket align with any aperture 67 on the bar 68 (i.e. the second pair of apertures 169 in the first grouping 110*a* or either pair of apertures 169 in the second grouping 110*a*). In some implementations, the pin 66 can include a magnetic element such that it couples more reliably with the bracket 63. For example, the pin 66 can include a magnetic element 155 on a surface configured to lie flat against a side 105*b* of the bracket 63 when the shaft of the pin 66 extends through the pair of apertures 169 (see FIG. 18A).

The increments in spacing between the pairs of apertures 169 as well as the spacing between the groups 110 described above relative to the spacing between the apertures 67 on the bar 68 allow the support members 60 to be fixed along the bar 68 at a plurality of selectable positions. In some implementations, the selectable positions are separated from one another by 0.25", 0.5", 0.75", 1.0", 1.25", 1.5", 1.75", 2" or greater. In some implementations, the selectable positions of the support members 60 are spaced at increments as small as quarter inch. Smaller spacing between apertures 67 or 69 increases the number of apertures 67 or 69 and in turn a greater variety of widths possible for the slots 61. This greater customization allows for each pallet to be universally suitable for a larger variety of inventory types having different widths. Each slot 61 can be customized to have a width that is adjustable in quarter inch increments, for example, between about 4.5", 4.75", 5.0", 5.25", 5.5", 5.75", 6", 7", 8", 9", 10", 15", 20", 25", up to the width of the pallet base itself, including any quarter inch increment in between.

As mentioned above, the base 15 of the pallet 10 can have a rectangular shape such that the width is approximately 90 to 94 inches wide. Such a pallet 10 can be configured to receive different sized inventory. FIGS. 6-11 show a pallet 10 having a base 15 reversibly coupled to a plurality of support members 60 extending upward from and removably attached to the base 15. The pallet 10 need not include a gate or sides as shown in the implementation of FIGS. 1-5. Instead, one of the support members 60 forms a front side and another one of the support members 60 forms the back side. The support members 60 can be removably coupled to the base 15 at a plurality of couplings 64 such that the number and relative position of the support members 60 can be adjusted thereby customizing the width of each of the slots 61. As described above, the couplings 64 can provide incremental adjustment of the spacing between the support members 60 (i.e. in ¼" increments). The support members 60 can include a plurality of vertical bars 62 coupled together by one or more horizontal bars. It should be appreciated, however, that the configuration of the support members 60 can vary.

Figure 9:
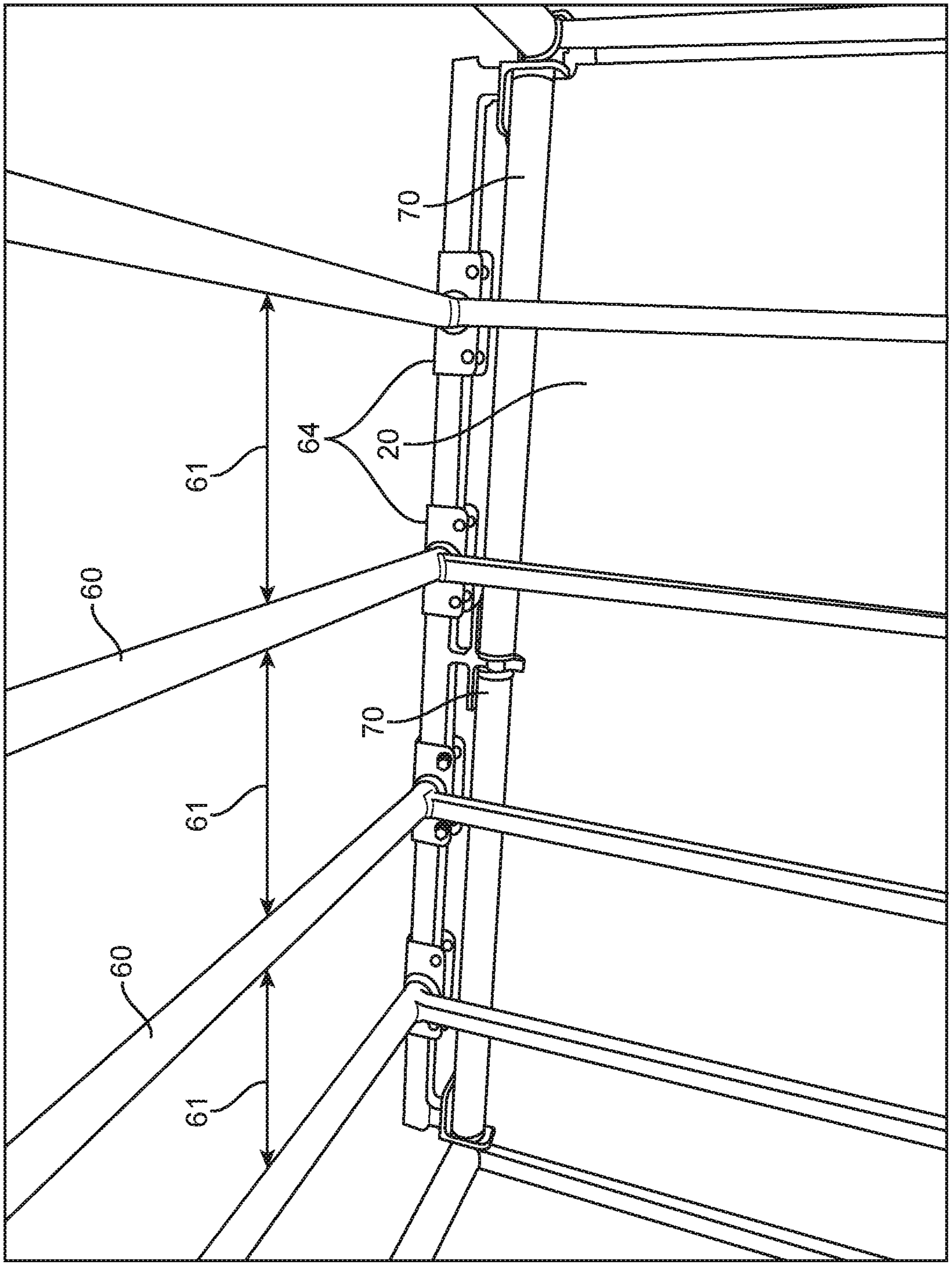
FIG. 9 is a detailed view of the pallet of FIG. 6.
Figure 10:
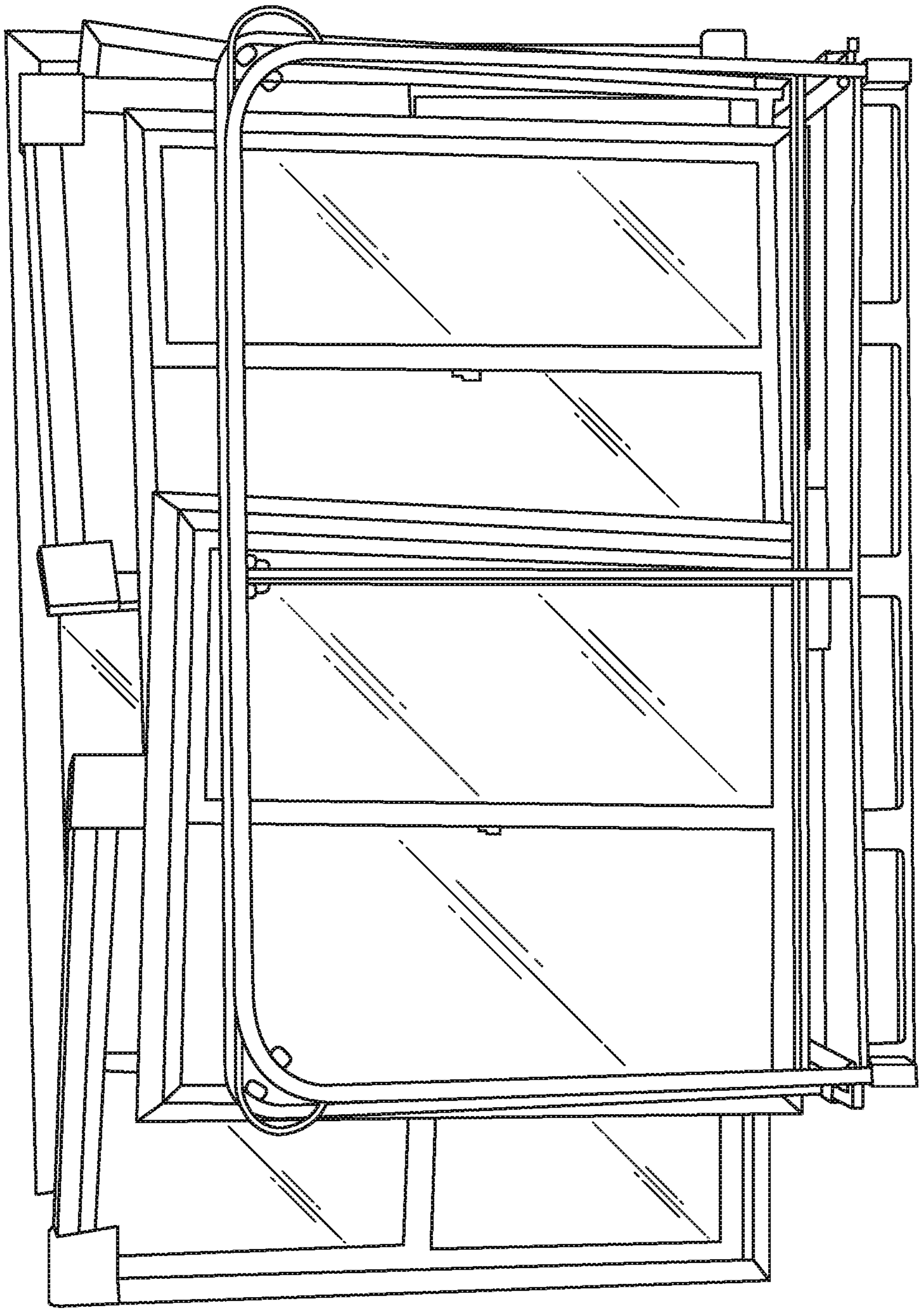
FIG. 10 is a side view of the pallet of FIG. 6 in use storing and displaying inventory.
Figure 11:
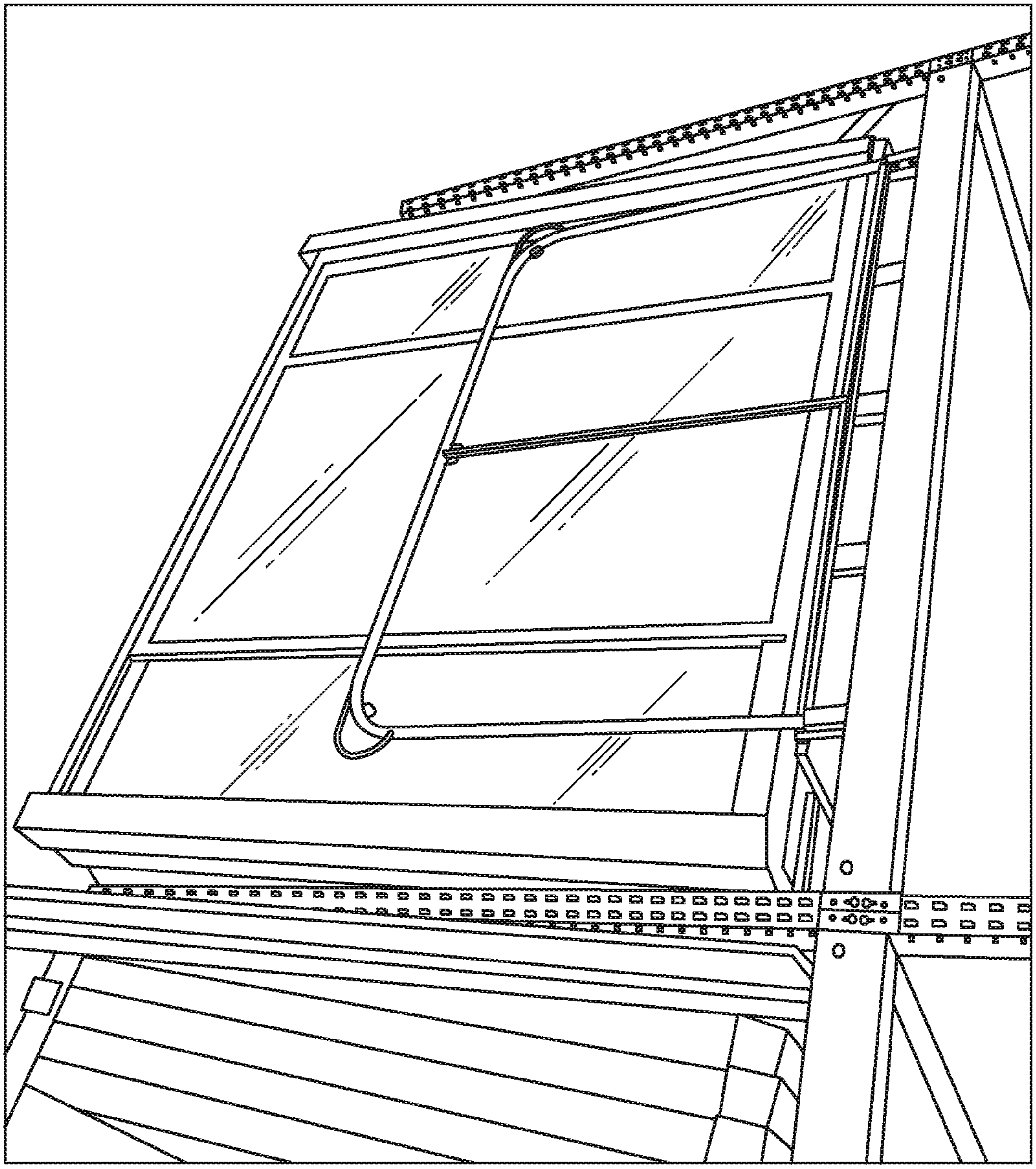
FIG. 11 is a front view of the pallet of FIG. 6 in use storing and displaying inventory.

As best shown in FIG. 9, one or more roller bars 70 can be positioned relative to the base 15 near an entrance to the slots 61 such that sliding inventory onto and out from the base 15 of the pallet 10 is assisted. The roller bars 70 can be arranged such that they extend slightly above the top 20 of the base 15 providing a surface against which the inventory can more easily slide past the couplings 64 as it is slide into and out from the pallet 10 from a lateral side. FIGS. 10-11 illustrate the pallet 10 in use with inventory.

Figure 12:
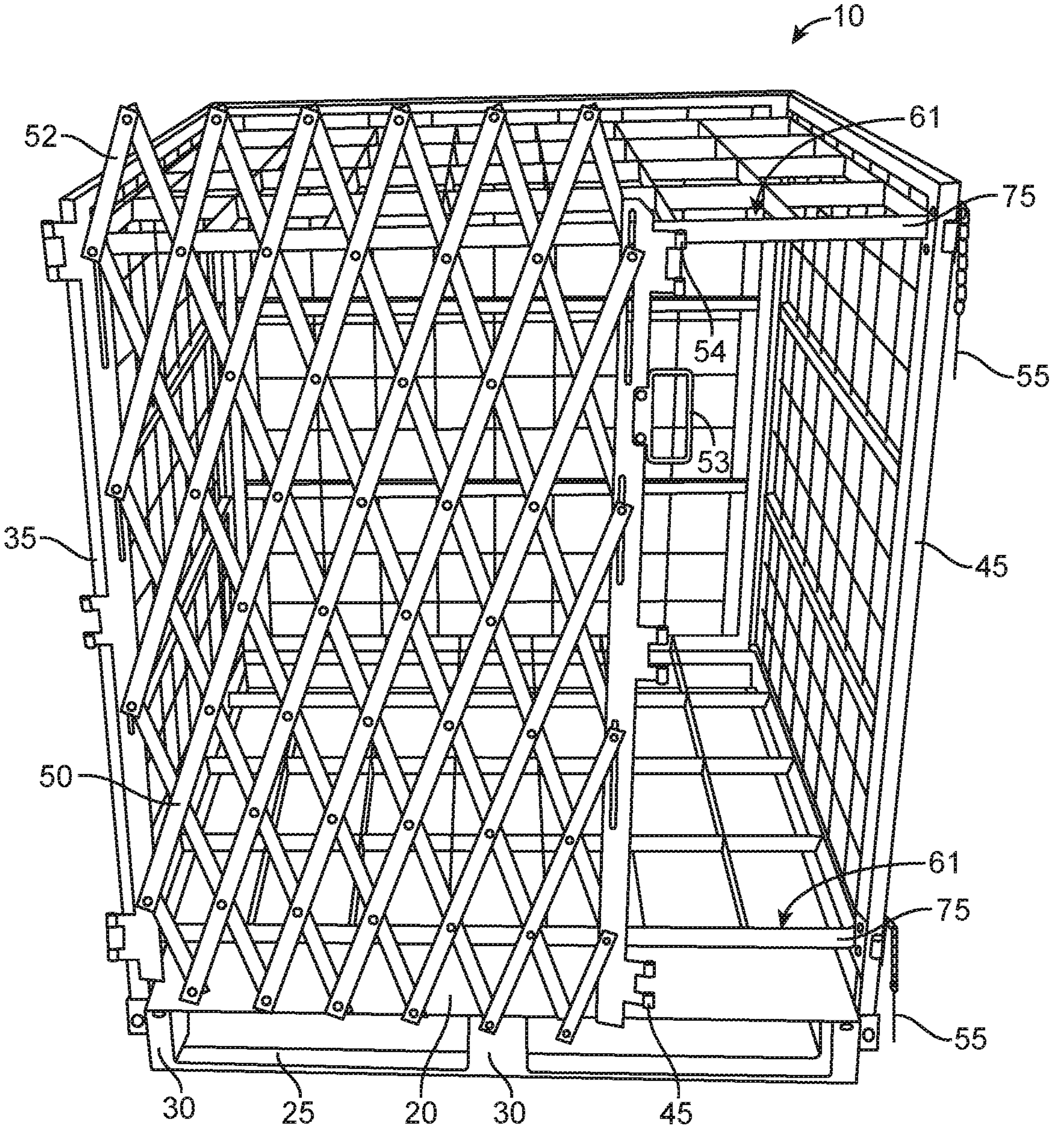
FIG. 12 is a front view of another implementation of a pallet having a grate.
Figure 13:
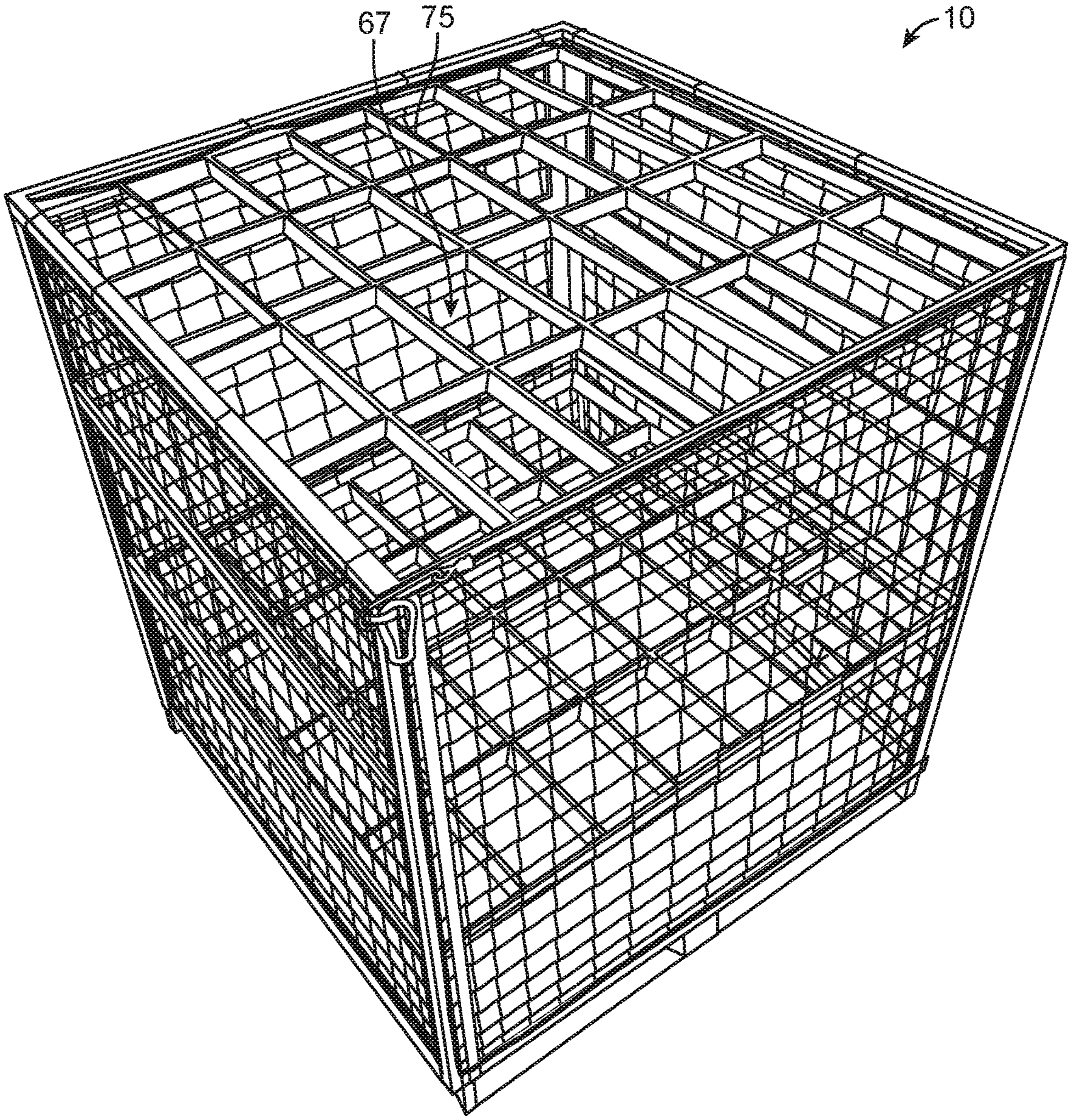
FIG. 13 is a front perspective view of the pallet of FIG. 12 fully enclosed.
Figure 14:
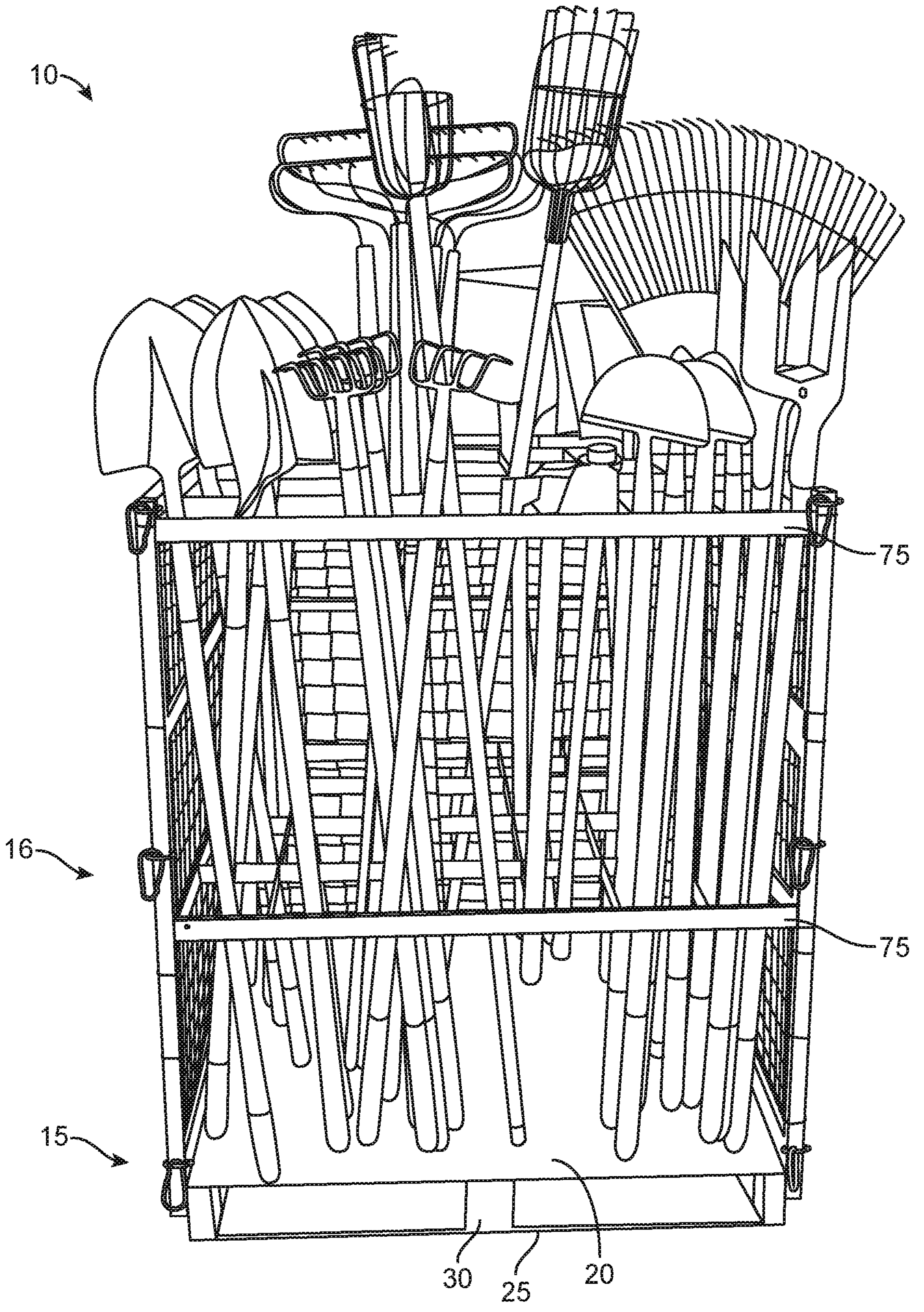
FIG. 14 is a front view of the pallet of FIG. 12 in use storing and displaying inventory.

As described above, the pallets 10 described herein can be modular in that one or more components of the pallet 10 can be removed in order to customize the pallet 10 to the type of inventory being stored. For example, the cage 16 can be configured to include one or more supports, sides, and/or gates as described above. The cage 16 can also be configured to include one or more shelves or grates as will be described in more detail below. FIGS. 12-14 illustrate an implementation of a pallet 10 having a base 15 removably coupled to an upper cage 16. The cage 16 can include one or more removable and customizable grates 75 configured to support elongate elements in a vertical position relative to the cage 16. In some implementations, the cage 16 can include an upper grate 75 adjustably positioned near a top of the cage 16 and a lower grate 75 adjustably positioned near the base 15 of the pallet 10. The height of the grates 75 relative to the cage 16 can be adjusted as described elsewhere herein (e.g. brackets 63 having apertures 69 configured to engage with apertures 67 in bars of the sides and fixed with pins 55) in order to customize the pallet 10 for the type of inventory being stored and displayed. The height of the grates 75 can be adjusted in ¼", ½", 1" increments or other increments as described elsewhere herein. Each of the grates 75 includes a matching pattern of slots 61 aligned to receive the same elongate element in a vertical position. The shape of the slots 61 can vary including, but not limited to square, rectangular, oval, round, etc. The size of the slots 61 can vary, but are sized sufficient to receive through them at least one item of inventory with which the grate 75 is intended to be used. In some implementations, the size of the slots 61 is about 5 sq. in. up to about the area of the pallet 10 itself. FIG. 14 illustrates the pallet 10 displaying tools such as shovels and rakes supported in a vertical position through the slots 61 of the upper and lower grates 75. In some implementations, the cage 16 is enclosed having four sides (see FIG. 13). In other implementations, the cage 16 can include three fixed sides and a movable gate 50 (see FIG. 12) although the gate 50 need not be included (see FIG. 14). The sides 35, 40, 45 of the cage 16 can include a more enclosed architecture such that they form a fence, net, or screen. As with the implementations described elsewhere herein, the sides 35, 40, 45 can be removable from the cage 16. The sides 35, 40, 45 can incorporate removable features such as the fencing, netting, screens, or other features. In some implementations, each sides incorporates a removable screen configured to be inserted parallel to the side. The mechanism of attachment and removal of the screens can vary as is known in the art including, but not limited to clamps, clips, ball/detent, or a boss/pocket arrangement.

Figure 15:
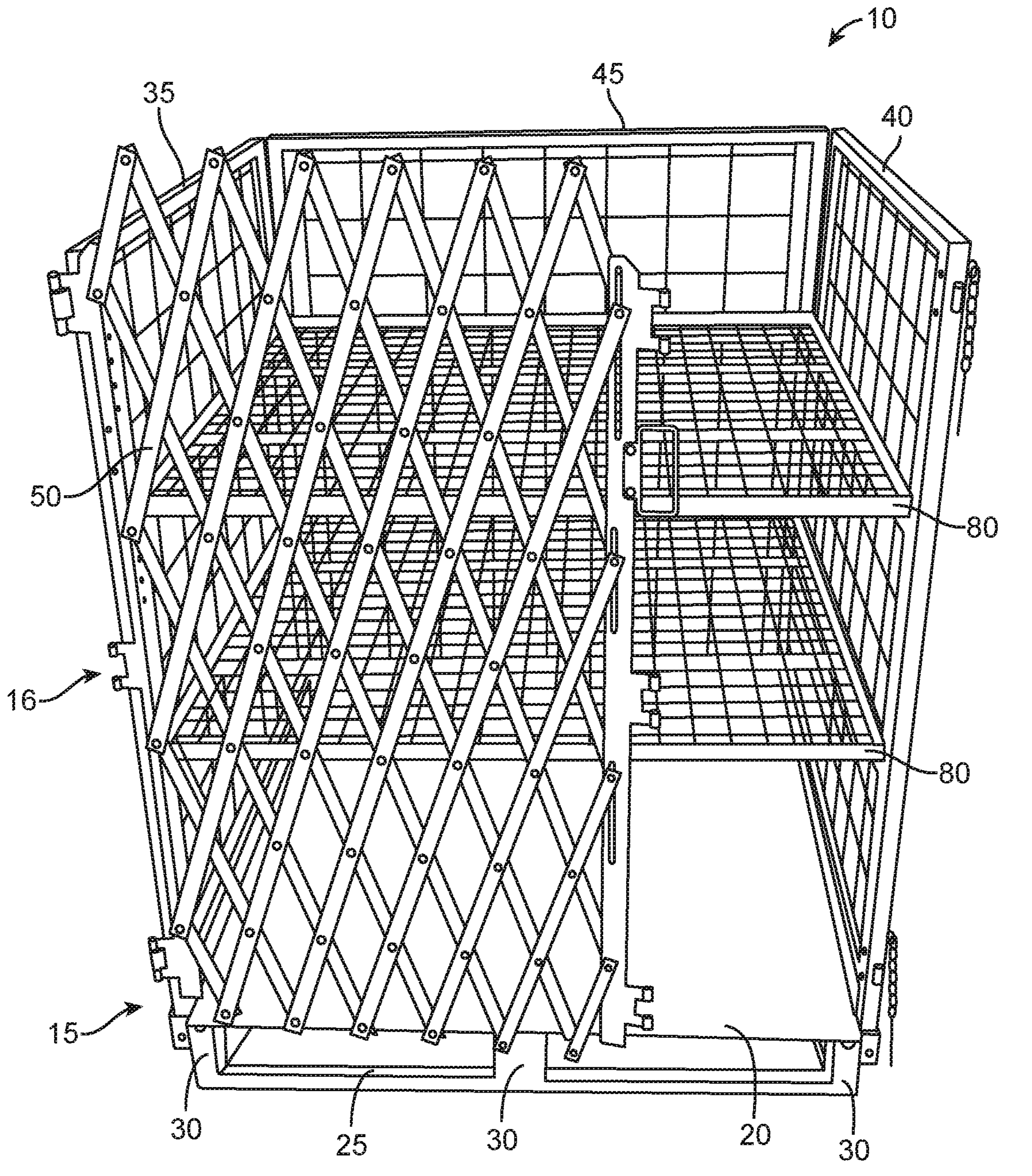
FIG. 15 is a front view of another implementation of a pallet having shelves.
Figure 16:
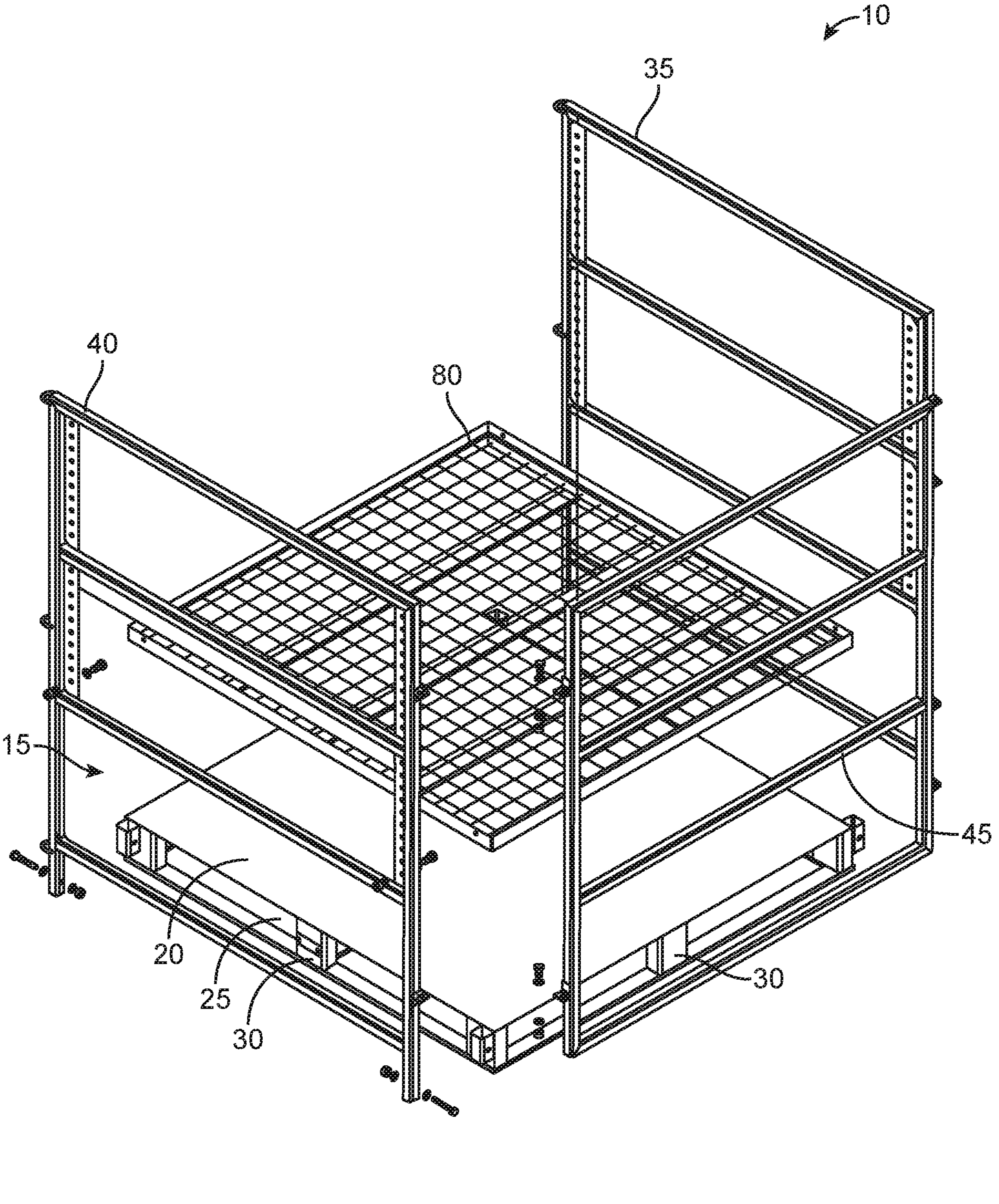
FIG. 16 is an exploded view of the pallet of FIG. 15.
Figure 17:
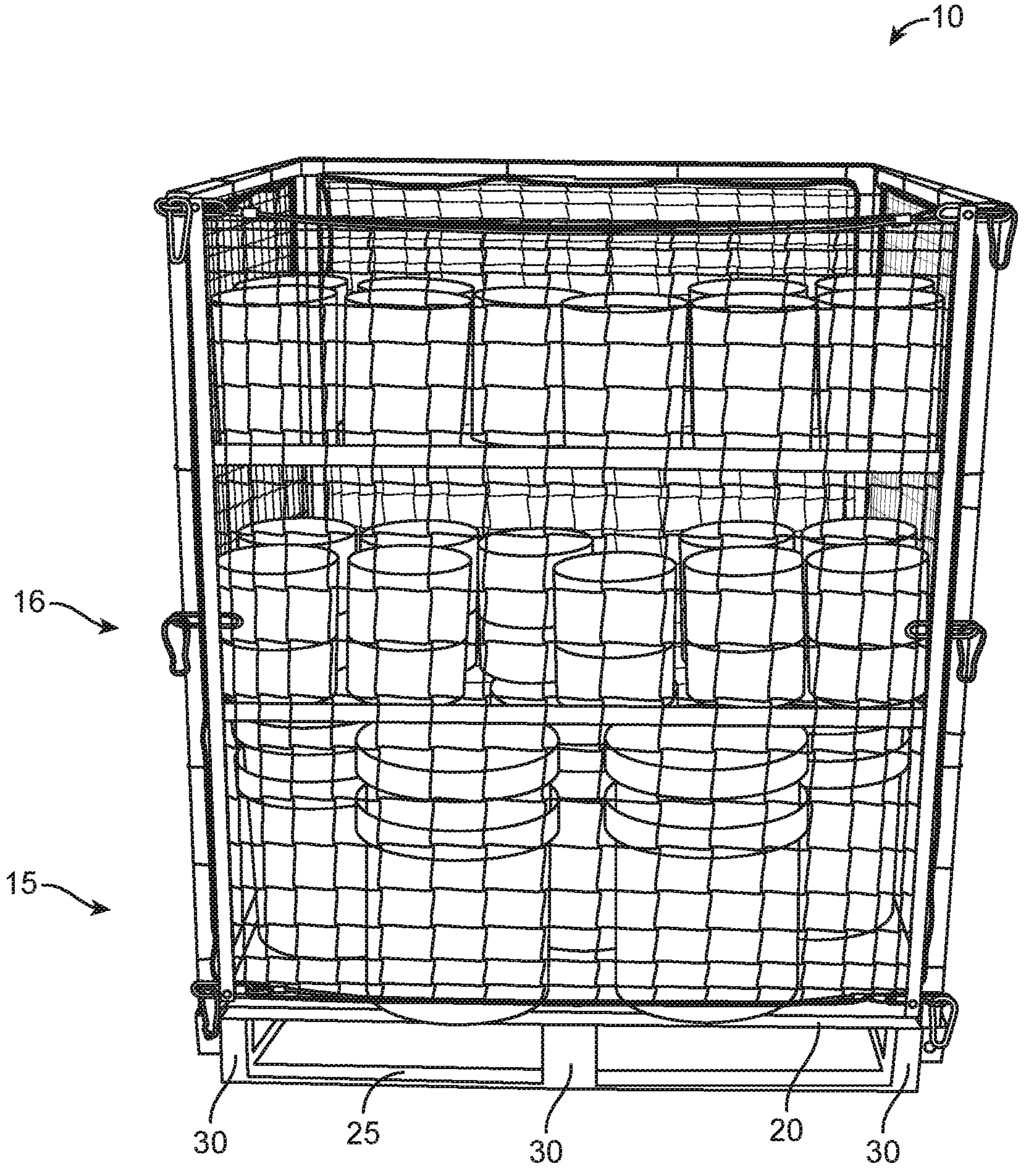
FIG. 17 is a front view of the pallet of FIG. 15 in use storing and displaying inventory.

FIGS. 15-17 illustrate another implementation of a pallet 10 having a base 15 removably coupled to an upper cage 16. The cage 16 can include one or more removable and customizable shelves 80 supported by the sides 35, 40, 45 of the cage 16. The shelves 80 can be removably adjustable along a vertical dimension relative to the sides 35, 40, 45 of the cage 16 as described elsewhere herein. For example, the sides 35, 40, 45 can incorporate apertures 67 separated along predefined increments, such as 1" increments, that allow the height of the shelves 80 to be adjusted. The pallet 10 can include a gate 50 coupled to a front side of the cage 16 as described elsewhere herein.

Any of the various implementations of the pallet 10 described herein can be customized such that the one or more components of the cage 16 can be removably coupled from the base 15. As such, the pallet 10 is universal or modular in design and can be used to hold, move, and/or display any of a variety of inventory. For example, a cage 16 having one or more shelves 80 can be coupled to a base 15 to create a pallet 10 useful for holding paint cans or other smaller sized inventory (see FIGS. 15-17). The same pallet 10 can be adjusted by removing the shelves 80 from the cage 16 and coupling one or more supporting members 60 such that the pallet 10 can be used for storing larger more planar inventory in a vertically upright (FIGS. 1-5) or a sideways position (FIGS. 6-11). And still, the same pallet 10 can be adjusted by removing the supporting members 60 and installing upper and lower grates 75 to store narrow elongate inventory (see FIGS. 12-14).

Figure 19A:
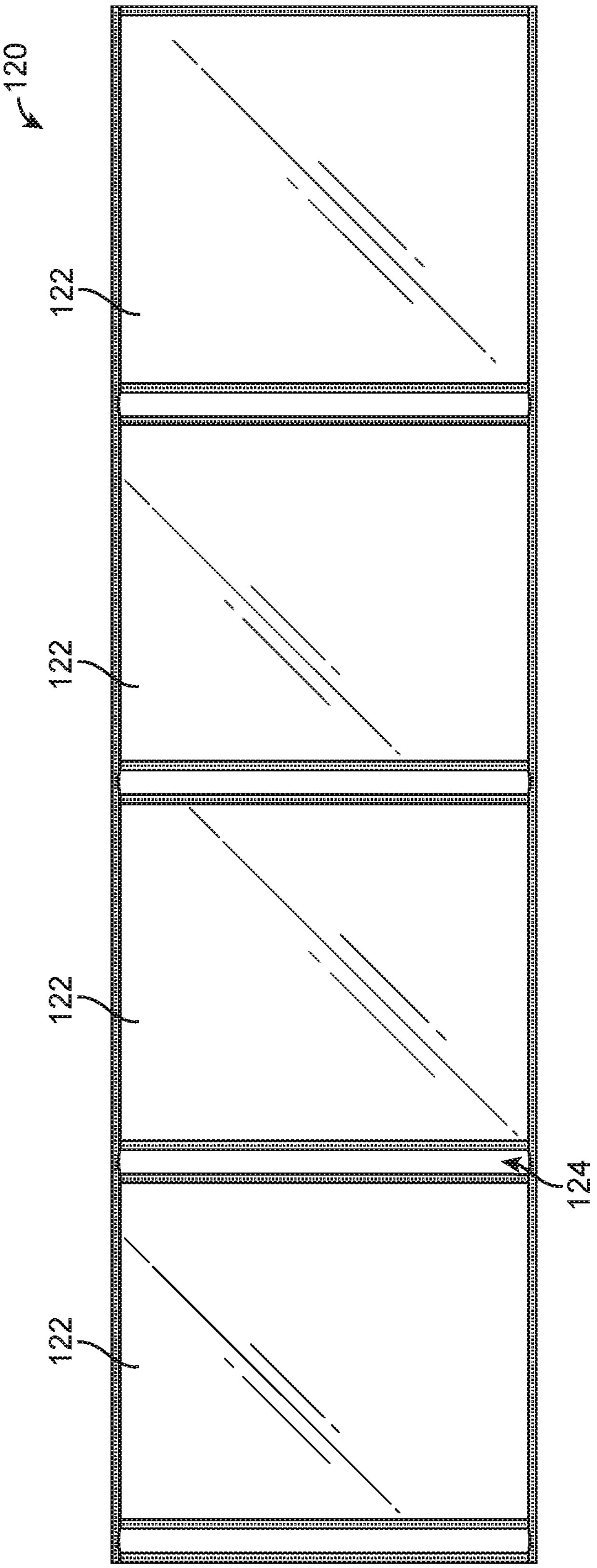
FIGS. 19A-19B show expanded and folded views, respectively, of a foldable sign holder.
Figure 19B:
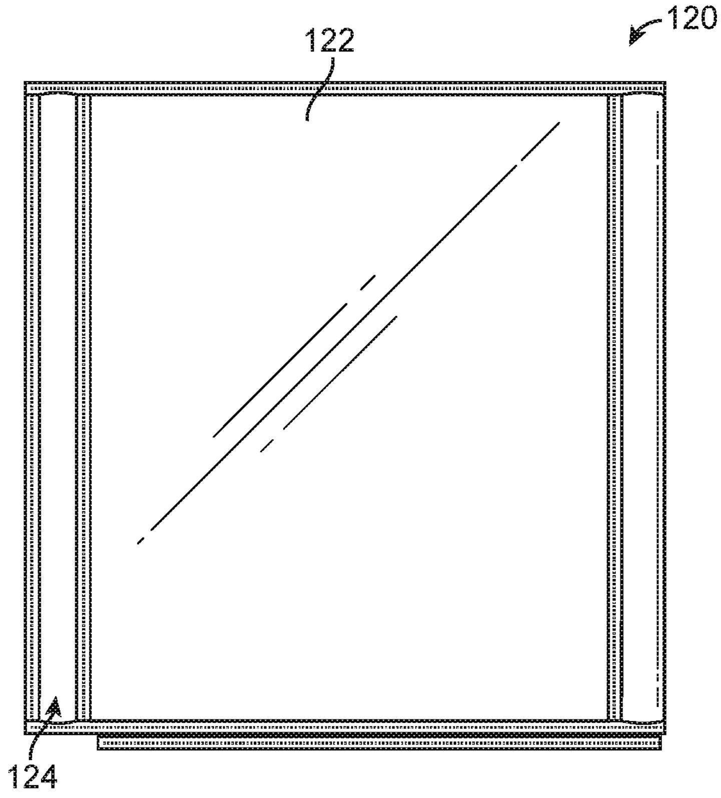

The pallets described herein can include other user features such as sign holders 120 for retaining and displaying retail information (see FIGS. 19A-19B). In some implementations, the sign holder 120 can incorporate a single pocket 122 or a plurality of pockets 122 for holding different information. The sign holder 120 can be a single-fold or 2-, 3-, 4-, or other fold holder configuration to display multiple signs. The sign holder 120 can have a landscape or portrait orientation. The sign holder 120 can be rigid or can be soft. In some implementations, the sign holder 120 can be formed of a soft plastic material. At least a front side of the sign holder 120 is formed of a transparent material such as plastic or glass such that information is freely visible from the front of the sign holder 120. The pockets 122 of the sign holder 120 can be movable relative to one another such as by a hinge 124 or a flexible material connecting each of the pockets 122 to the other. The pockets 122 of the 4-fold holder 120 can be configured to fold over onto themselves (FIG. 19B) or extend fully (see FIG. 19A) to display all of the pockets 122 of the holder 120. Information such as signage can be inserted into each pocket 122 such as from an upper end or a side of each pocket similar to how a photo album displays photos. In one implementation, the sign holder 120 is a 4-fold, plastic sign holder having a landscape orientation that can be affixed such as by hanging from a region near the top of the front gate 50. The sign holder 120 can be affixed to one or more locations on the pallet 10 such as the front gate 50 or one or more of the sides 35, 40, 45. In some implementations, the sign holder 120 is coupled to the front gate 50 spaced a distance away from the hinges 51. As described elsewhere herein, the gate 50 can articulate around its hinges 51 at least 270 degrees such that the gate 50 abuts flat against the adjacent side. To avoid the sign holder 120 from being trapped within a region of the hinge 51, the sign holder 120 can be affixed a distance of at least one diamond (a diamond being formed by neighboring slats 52) away from the hinge 51. In some implementations, the sign holder 120 is affixed one diamond away from where the fastener 54 is located. The sign holder 120 can be affixed at a location that is not aligned with a center of the gate 50.

Implementations are described herein having a variety of features, including coupling elements, supports, fasteners, and other structural elements. The implementations described herein are fully adjustable and modular. Thus, where a foldable, articulating gate is described as being incorporated with one implementation it should be appreciated that another implementation may likewise include the gate although it may not be explicitly specified herein. Similarly, a coupling element or fastener may be described in reference to a particular implementation, but any of the other implementations may incorporate such coupling element or fastener without being explicitly described as such. The implementation are shown in the drawings as having a certain number of support members 60 arranged in a particular relationship to the base of the pallet 10. The support members 60 described herein are fully modular and may be adjusted in their spacing relative to one another as well as their total number. It should be appreciate the support members 60 can be removed, replaced, and adjusted by virtue of their coupling 64 with the bar 68. Similarly, the shelves 80 and grates 75 described herein are fully modular and may be removed, replaced, and adjusted by virtue of their coupling 64 with the bar 68. The pallets described herein may be configured to include more the one of the modular features described herein. As an example, a pallet 10 having one or more shelves 80 can additionally include one or more of a grate 75, gate 50, side covering (fence, screen, net, canvas, etc.), and the like. Similarly, a pallet 10 incorporating one or more support members 60 can likewise include one or more of a shelf 80, grate 75, gate 50, side covering, and the like. The sides of the cage 16 as well as perimeter of the base 15 can be configured to incorporating any number of couplings 64 that support these features for full adjustability and modularity (horizontally and vertically) such that the pallet 10 can be configured for various sizes and types of inventory.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed is:

1. A pallet comprising:

a base comprising a length extending between a first end and a second end opposite the first end and a width transverse to the length;

a cage removably coupled to the base and comprising a first side coupled to a back side coupled to a second side;

a gate forming a front side of the cage that is removably connected to the first side of the cage and the second side of the cage, wherein the gate has a multiplicity of slats interconnected in a scissoring lattice-type structure configured to extend within a plane of the front side between a compact, collapsed narrow configuration to an expanded, wider configuration extending between the first second and the second side of the cage, and at least one shelf coupled to the cage by an adjustable coupling configured to adjust the at least one shelf along a vertical dimension relative to the cage creating a first space under the at least one shelf having a first height and a second space above the at least one shelf having a second height, the first and second heights of the first and second spaces being adjustable based upon a selected vertical position of the adjustable coupling, wherein the adjustable coupling comprises a first plurality of apertures on the first side of the cage and at least a first fixator configured to insert through at least one of the first plurality of apertures, a second plurality of apertures on the second side of the cage and at least a second fixator configured to insert through at least one of the second plurality of apertures, to fix the shelf at the selected vertical position preventing relative movement between the cage and the at least one shelf.

2. The pallet of claim 1, wherein the base is configured for full forklift access along at least the length and the width of the base.

3. The pallet of claim 1, further comprising a plurality of shelves in addition to the at least one shelf, the plurality of shelves removably attached to one or more regions of the cage.

4. The pallet of claim 1, wherein the at least one shelf is arranged relative to the pallet such that individual items of inventory are insertable within at least one of the first and second spaces.

5. The pallet of claim 4, wherein the items of inventory are removable from the front side of the cage.

6. The pallet of claim 1, further comprising one or more removable enclosures configured to couple to at least one of the first side, back side, and the second side.

7. The pallet of claim 4, wherein the removable enclosures comprise a fence, a net, or a screen.

8. The pallet of claim 4, wherein the removable enclosures couple by one or more of a clamp, clip, ball/detent, or a boss/pocket arrangement.

9. The pallet of claim 1, wherein the base is formed of wood, plastic, foam, rubber, metal.

10. The pallet of claim 1, wherein the adjustable coupling is adjustable in a tool-less manner.

11. The pallet of claim 1, wherein the first plurality of apertures and second plurality of apertures are similarly spaced to ensure the at least one shelf lies horizontally.

12. The pallet of claim 11, wherein the first and second plurality of apertures are selectable at 0.25" increments up to about 1" increments.

13. The pallet of claim 1, wherein the adjustable coupling is configured to allow customization of the pallet to hold, move, and/or display a first type of inventory when the at least one shelf is coupled to the cage and at least a second type of inventory when the at least one shelf is removed from the cage.

14. The pallet of claim 13, wherein the first type of inventory is shorter than the second type of inventory.

15. The pallet of claim 1, wherein the at least one shelf is removeable so as to couple at least one support member to the cage, wherein the at least one support member is coupled to the back side of the cage by an adjustable coupling, the at least one support member creating a first slot, wherein the slot has a width relative to the base, wherein the width of the slot is adjustable based upon a selected horizontal position of the adjustable coupling.

16. The pallet of claim 15, wherein the adjustable coupling comprises a bracket having a pair of apertures and a fixator, the bracket being shaped and sized to receive a bar on the back side of the cage within an interior of the bracket, and the fixator configured to insert through the pair of apertures in the bracket to fix the bar inside of the bracket at the selected horizontal position preventing relative movement between the bracket and the bar.

17. The pallet of claim 1, wherein the gate is removably connected with the cage at the first side forming a hinge, wherein the hinge is offset laterally outward from the multiplicity of slats.

18. The pallet of claim 17, wherein the gate is configured to rotate around an axis of the hinge up to 270 degrees.

19. The pallet of claim 18, wherein the gate forms the front side of the cage upon no rotation around the axis of the hinge and abuts the first side of the cage upon rotation 270 degrees the gate around the axis of the hinge.

20. The pallet of claim 17, wherein the gate is removably connected with the cage at the second side by a fastener configured to latch the gate in the expanded, wider configuration.

* * * * *